US012777991B2

(12) United States Patent
Saito et al.

(10) Patent No.: US 12,777,991 B2
(45) Date of Patent: Nov. 3, 2026

(54) CONTROL METHOD OF WORK VEHICLE, WORK VEHICLE CONTROL PROGRAM, WORK VEHICLE CONTROL SYSTEM, AND WORK SYSTEM

(71) Applicant: Yanmar Holdings Co., Ltd., Osaka (JP)

(72) Inventors: Masafumi Saito, Okayama (JP); Keisuke Iwamura, Okayama (JP)

(73) Assignee: Yanmar Holdings Co., Ltd., Osaka (JP)

( * ) Notice: Subject to any disclaimer, the term of this patent is extended or adjusted under 35 U.S.C. 154(b) by 70 days.

(21) Appl. No.: 18/583,895

(22) Filed: Feb. 22, 2024

(65) Prior Publication Data

US 2024/0324483 A1 Oct. 3, 2024

(30) Foreign Application Priority Data

Mar. 30, 2023 (JP) ................................ 2023-054948

(51) Int. Cl.
*A01B 69/00* (2006.01)
*A01B 69/04* (2006.01)

(52) U.S. Cl.
CPC .................................. *A01B 69/008* (2013.01)

(58) Field of Classification Search
None
See application file for complete search history.

(56) References Cited

U.S. PATENT DOCUMENTS 9,561,819 B2 * 2/2017 Tuttle ..................... B62D 6/001
12,103,607 B2 * 10/2024 Maruyama ........... B62D 5/0457
2003/0045981 A1 * 3/2003 Kifuku ................. B62D 5/0469 180/443
2009/0164066 A1 * 6/2009 Oezaslan ........... B62D 15/0285 701/41
2018/0237062 A1 * 8/2018 Saal ..................... B62D 5/0469
2020/0086911 A1 * 3/2020 Stahl ...................... B62D 6/002
2021/0347411 A1 * 11/2021 Roat ...................... B62D 12/00
2024/0140525 A1 * 5/2024 Maruyama ........... B62D 5/0457

FOREIGN PATENT DOCUMENTS

CN 106985903 B * 4/2020 ............. B62D 1/166
EP 3798097 A1 9/2020
EP 4086148 A1 * 11/2022 ........... B62D 5/0457
JP 2016155519 A 9/2016
JP 7063428 B1 * 5/2022 ........... B62D 5/0469
JP 2022138309 A * 9/2022
JP 2022150399 A * 10/2022
JP 7569082 B2 * 10/2024

* cited by examiner

*Primary Examiner* — Shelley Chen
(74) *Attorney, Agent, or Firm* — Chris Mizumoto

(57) ABSTRACT

A control method of a work vehicle is a control method of a work vehicle having an automatic steering mode for automatically steering a steered wheel using a motor. The control method includes: in the automatic steering mode, controlling the motor; determining whether the work vehicle is in an override state on the basis of a determination condition related to torque generated in the motor; and changing the determination condition.

11 Claims, 16 Drawing Sheets

CONTROL METHOD OF WORK VEHICLE, WORK VEHICLE CONTROL PROGRAM, WORK VEHICLE CONTROL SYSTEM, AND WORK SYSTEM

CROSS-REFERENCE

This application claims foreign priority of JP2023-054948 filed Mar. 30, 2023, the disclosure of which is hereby incorporated by reference in its entirety.

TECHNICAL FIELD

The present invention relates to a control method of a work vehicle having an automatic steering mode for automatically steering a steered wheel, a work vehicle control program, a work vehicle control system, and a work system.

BACKGROUND ART

As a related art, a work vehicle autonomous traveling system that causes a work vehicle (tractor) to autonomously travel is known (for example, refer to Patent Document 1). In the related art, autonomous traveling control includes automatic steering control for automatically steering steered wheels (right and left front wheels). In the work vehicle, a steering wheel that enables manual steering of the steered wheels via an electric power steering mechanism including, for example, an (electric) motor is provided.

In the automatic steering control, a steering angle setting unit obtains and sets a target steering angle of the steered wheels on the basis of a target route and output of a positioning unit, and outputs the set target steering angle to the power steering mechanism. Then, the power steering mechanism automatically steers the steered wheels on the basis of the target steering angle and output of a steering angle sensor such that the target steering angle is obtained as a steering angle of the steered wheels.

PRIOR ART DOCUMENT

Patent Document

Patent Document 1: JP 2019-53471 A

SUMMARY OF INVENTION

Technical Problem

In the configuration of the related art described above, when the steered wheels are automatically steered beyond a fully turned state in which the steered wheels are steered to a maximum turning angle, excessive torque is generated in the motor of the power steering mechanism, and the automatic steering may be canceled due to determination of an override state. When a threshold value of the torque for the determination of the override state is set to be large, such a defect can be easily avoided. However, in this case, a situation in which the excessive torque is generated in the motor is prolonged, and the motor may be damaged.

Furthermore, relatively large force is required for an operation of the steering wheel for switching to the manual steering, and the operability of an operator may be reduced.

It is an object of the present invention to provide a control method of a work vehicle, a work vehicle control program, a work vehicle control system, and a work system, by which a defect due to automatic steering of a steered wheel beyond a fully turned state is less likely to occur.

Solution to Problem

A control method of a work vehicle according to one aspect of the present invention is a control method of a work vehicle having an automatic steering mode for automatically steering a steered wheel using a motor, and includes: in the automatic steering mode, controlling the motor; and executing turning angle determination processing of determining whether the steered wheel is in a fully turned state in which the steered wheel is steered to a maximum turning angle on the basis of a turning angle determination condition.

A work vehicle control program according to one aspect of the present invention is a program for causing one or more processors to execute the control method of a work vehicle.

A work vehicle control system according to one aspect of the present invention is used in a work vehicle having an automatic steering mode for automatically steering a steered wheel using a motor, and includes an automatic steering processing unit, and a turning angle determination processing unit. The automatic steering processing unit controls the motor in the automatic steering mode. The turning angle determination processing unit determines whether the steered wheel is in a fully turned state in which the steered wheel is steered to a maximum turning angle on the basis of a turning angle determination condition.

A work system according to one aspect of the present invention includes the work vehicle control system and a machine body of the work vehicle.

Advantageous Effects of Invention

According to the present invention, a control method of a work vehicle, a work vehicle control program, a work vehicle control system, and a work system, by which a defect due to automatic steering of a steered wheel beyond a fully turned state is less likely to occur, can be provided.

DESCRIPTION OF EMBODIMENTS

Figure 1:
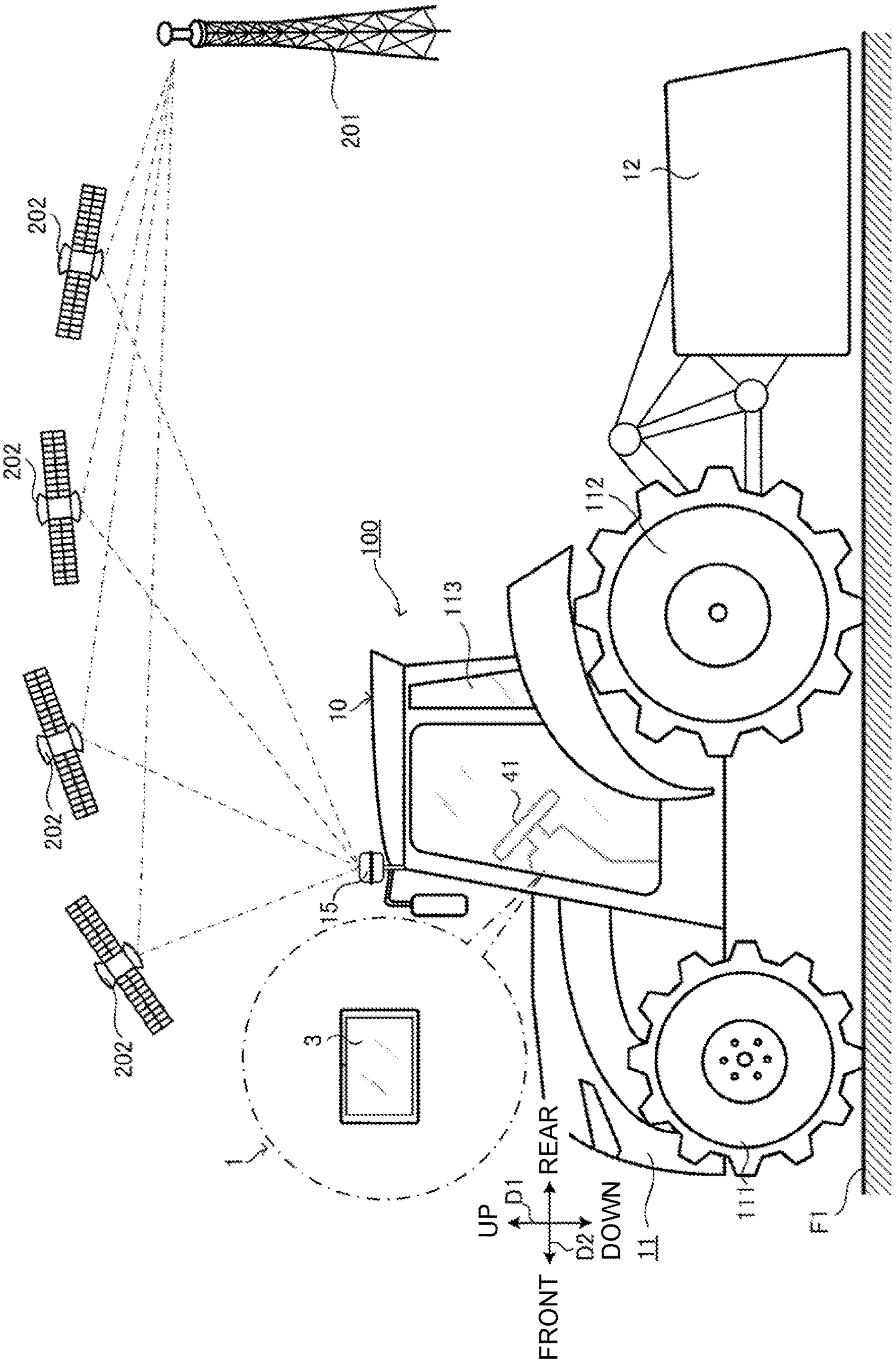
FIG. 1 is a schematic side view illustrating external appearance of a work vehicle according to a first embodiment.

Hereinafter, embodiments of the present invention will be described with reference to the attached drawings. The following embodiments are examples that embody the present invention and are not intended to limit the technical scope of the present invention.

First Embodiment

[1] Overall Configuration

First, an overall configuration of a work system 100 according to the present embodiment will be described with reference to FIG. 1 and FIG. 2. A work vehicle control system 1 (hereinafter, also simply referred to as "control system 1") according to the present embodiment configures the work system 100 together with a machine body 11 of a work vehicle 10. A work machine 12 is mounted on the machine body 11. In other words, the work system 100 includes the work vehicle control system 1 and the machine body 11 of the work vehicle 10 (on which the work machine 12 is mounted).

In the present embodiment, the control system 1 includes a control device 2 (refer to FIG. 2) mounted on the machine body 11 of the work vehicle 10, and a terminal device 3. The work vehicle 10 and the terminal device 3 can communicate with each other. The term "can communicate" in the present disclosure means that information can be transmitted and received directly or indirectly through a communication network (network), a relay, or the like by an appropriate communication method such as wired communication or wireless communication (communication using a radio wave or light as a medium). The communication network includes, for example, the Internet, a local area network (LAN), a wide area network (WAN), a public telephone line, a mobile phone line network, a packet line network, or a wireless LAN. A configuration in which the work vehicle 10 and the terminal device 3 can communicate with each other is not essential in the control system 1.

The work vehicle 10 performs some work in a target region F1 (refer to FIG. 1) by the work machine 12 while moving in the target region F1. The term "work" in the present disclosure is work performed for the target region F1 by the work machine 12, and includes, for example, various types of agricultural work such as tilling, leveling, seeding, fertilizing, spraying of agrochemicals, planting (rice planting), or harvesting, and various types of work such as construction work. In the present embodiment, as an example, the work performed by the work vehicle 10 is tilling work.

The work machine 12 performs work in the target region F1 when the machine body 11 of the work vehicle 10 moves in the target region F1. In the present embodiment, as an example, the work machine 12 is a tiller such as a rotary tiller or a plow that performs tilling work.

The work machine 12 of this type includes a direct-mounted work machine directly attached to a three point link and a towing work machine towed by the machine body 11. In the present embodiment, as an example, the work machine 12 is a direct-mounted rotary tiller detachably attached to the machine body 11 of the work vehicle 10. The work machine 12 is attached to the rear side of the machine body 11 (the opposite side of a direction of forward movement of the machine body 11). That is, the (direct-mounted) work machine 12 is connected to the rear side of the machine body 11, and performs work while moving forward together with the machine body 11 when the machine body 11 moves forward. In the present embodiment, the work machine 12 is included in components of the work vehicle 10, but the work machine 12 may not be included in the components of the work vehicle 10 because the work machine 12 is detachable from the machine body 11.

The term "work vehicle" in the present disclosure means, for example, a vehicle that performs various types of work in the target region F1 such as a field, and is, as an example, an agricultural machine such as a tractor, a seeder, a rice planter, a spreader, a sprayer, a transplanter, or a harvester. The work vehicle 10 may be, for example, a construction machine or the like. In the present embodiment, unless otherwise specified, a case where the work vehicle 10 is a tractor equipped with a rotary tiller as the work machine 12 will be described as an example. That is, the work vehicle 10 is configured by connecting a (direct-mounted) rotary tiller as the work machine 12 to a tractor as the machine body 11. In the work vehicle 10, the machine body 11 travels in the target region F1 such as a field, so that tilling work in the target region F1 can be performed.

Figure 3:
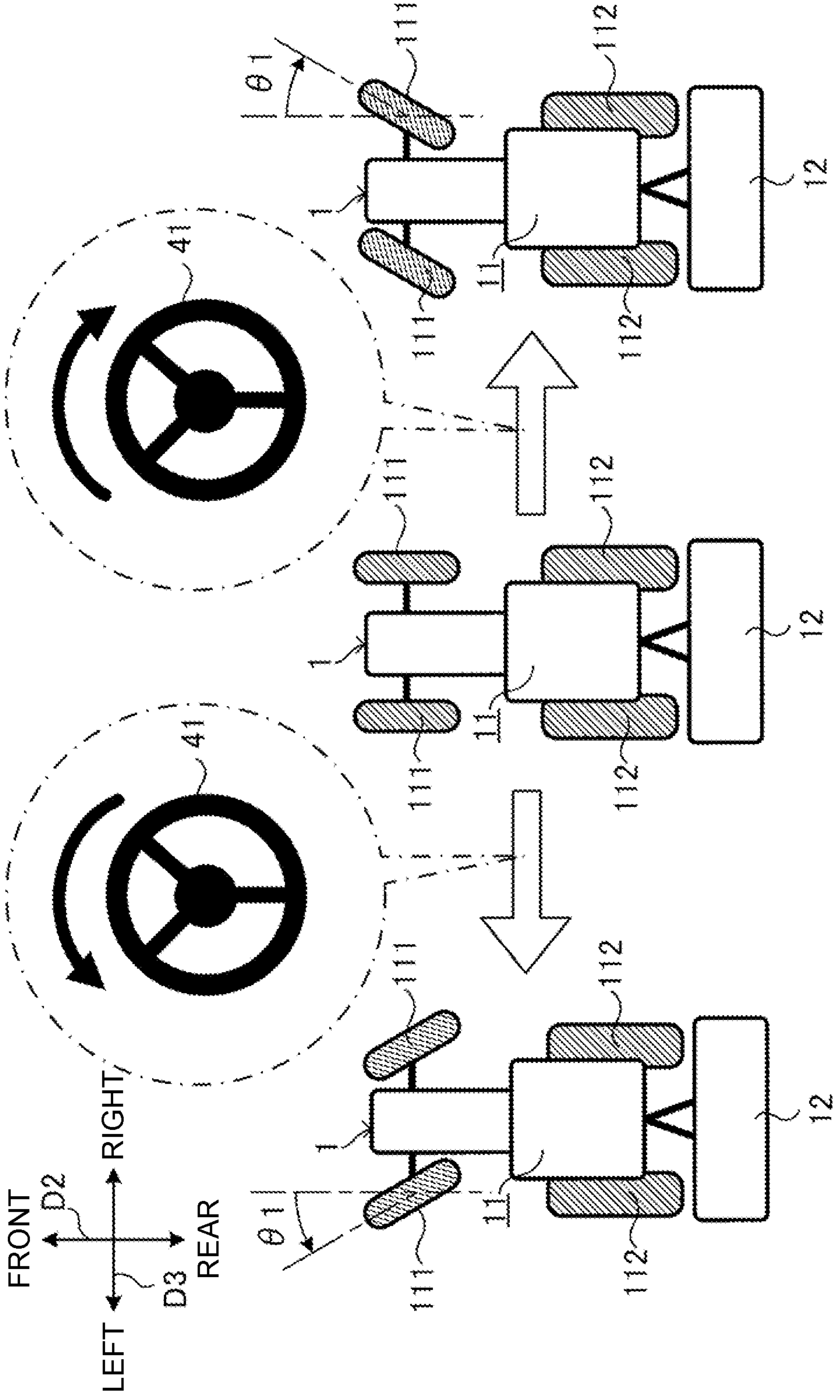
FIG. 3 is a schematic view explaining movement of steered wheels of the work vehicle according to the first embodiment.

As described above, in the present embodiment, the machine body 11 is a type of vehicle that moves by traveling in the target region F1. As illustrated in FIG. 1 and FIG. 3, the machine body 11 includes steered wheels 111 composed of a pair of right and left front wheels and drive wheels 112 composed of a pair of right and left rear wheels, and travels in the target region F1 by these four wheels (the pair of steered wheels 111 and the pair of drive wheels 112).

Moreover, in the present embodiment, as an example, it is assumed that the work vehicle 10 is an automatic machine that can act by automatic traveling (autonomous traveling or the like) while a person (operator) can board the work vehicle 10.

However, the present embodiment is not limited thereto, and the work vehicle 10 may be an unmanned machine that automatically travels, or may act by an operation (including a remote operation) by a person (operator).

The term "target region" in the present disclosure is a region in which the work vehicle 10 performs, for example, various types of work such as tilling, leveling, seeding, fertilizing, spraying of agrochemicals, planting (rice planting), or harvesting while moving, and includes a paddy field, a farm, an orchard, a pasture, and the like. For example, when a paddy field or a farm in which crops (agricultural products) such as rice, wheat, soybeans, buckwheat, or the like are grown is the target region F1, the crops grown in the target region F1 are agricultural products. Furthermore, when garden plants are grown in a garden plant farm, the garden plant farm is the target region F1, and when trees to be used as wood are grown in a forest, as in forestry, the forest is the target region F1. In this case, the crops grown in the target region F1 are garden plants, trees, or the like. In the present embodiment, unless otherwise specified, a case where the work vehicle 10 is used for tilling work of a field (target region F1) and the target region F1 is a paddy field for growing rice will be described as an example. Moreover, the target region F1 is not limited to a field. For example, when the work vehicle 10 is a construction machine, a site where the construction machine performs work is the target region F1.

Moreover, the work vehicle 10 can move by automatic traveling not only in the target region F1 (here, the field), but also on a road such as an out-of-field route outside the target region F1, for example. The work vehicle 10 is configured to be able to automatically travel (move) along a target route (including the out-of-field route) set in advance inside the target region F1 and outside the target region F1 on the basis of position information of the current position of the work vehicle 10 measured by a positioning device 15 (refer to FIG. 2). The out-of-field route is, for example, an inter-field connection route that connects a plurality of target regions F1 (fields). The inter-field connection route is a farm road, a forest road, a public road, a private road, a motorway, or the like, and may be a road dedicated to the work vehicle 10 or a road through which a general vehicle (a passenger vehicle or the like) can pass.

Moreover, the term "automatic traveling" in the present disclosure includes "autonomous traveling" in which the work vehicle 10 autonomously travels without depending on an operation of an operator, and "semi-automatic traveling" in which only steering is automated, such as straight-travel assist.

The "autonomous traveling" is, for example, a traveling mode in which the vehicle speed and the like are automatically controlled in addition to the automatic steering of the steered wheels 111 such that the work vehicle 10 travels along the target route. The "straight-travel assist" is, for example, a traveling mode in which only the automatic steering of the steered wheels 111 is performed and the vehicle speed and the like are controlled by the operation of the operator such that the work vehicle 10 travels along a straight route parallel to a straight line (reference line) serving as a reference. That is, in the "semi-automatic traveling," although the work vehicle 10 cannot travel without the operation of the operator, the burden on the operator for steering is reduced, and the work vehicle 10 can travel along the target route such as a straight route, which leads to an improvement in work efficiency. Since the steered wheels 111 are automatically steered in both the autonomous traveling and the semi-automatic traveling, the autonomous traveling or the semi-automatic traveling can be said to be one mode of an "automatic steering mode."

Figure 4:
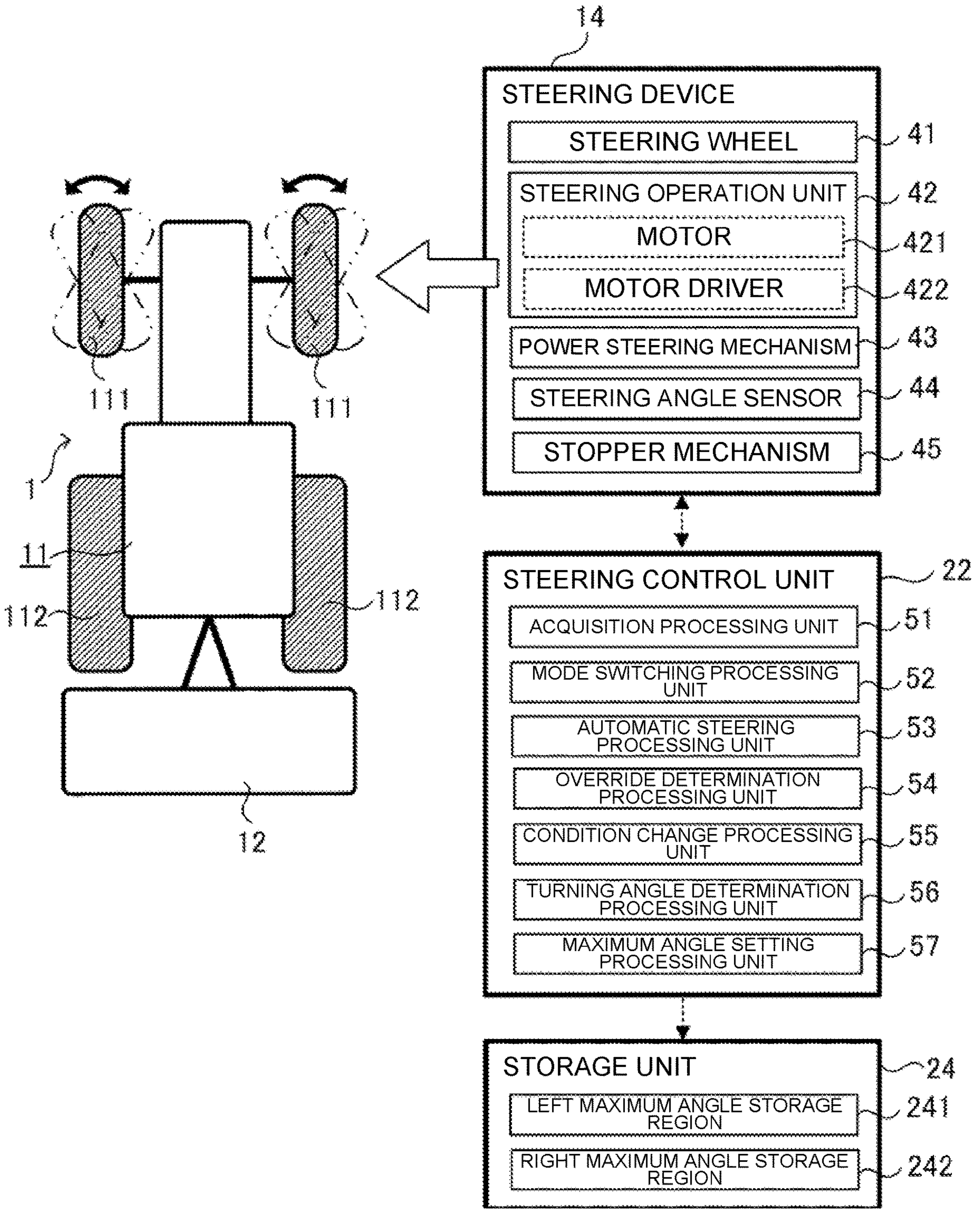
FIG. 4 is a schematic view illustrating a configuration related to a steering device in the work system according to the first embodiment.

In the automatic steering mode, the steered wheels 111 are automatically steered by a motor 421 (refer to FIG. 4). That is, the automatic steering is realized by changing the direction of the steered wheels 111 by the output of the motor 421 instead of operating a steering wheel 41 (refer to FIG. 1) by the operator. In short, the work vehicle 10 according to the present embodiment has the automatic steering mode for automatically steering the steered wheels using the motor 421.

[2] Configuration of Work Vehicle

Next, a configuration of the work vehicle 10 according to the present embodiment will be described in detail with reference to FIG. 1 to FIG. 3.

In the present embodiment, for convenience of explanation, a vertical direction in a state where the work vehicle 10 is usable is defined as an up-down direction D1 (refer to FIG. 1). A front-rear direction D2 and a left-right direction D3 (refer to FIG. 3) are defined on the basis of a direction viewed from a person (operator) riding on (a driving unit 113 of) the machine body 11 of the work vehicle 10. The left side of the left-right direction D3 refers to the left side when the machine body 11 is caused to travel forward (move forward), and the right side of the left-right direction D3 refers to the right side when the machine body 11 is caused to travel forward (move forward). However, these directions are not intended to limit a direction in which the work vehicle 10 is used (direction in use).

Figure 2:
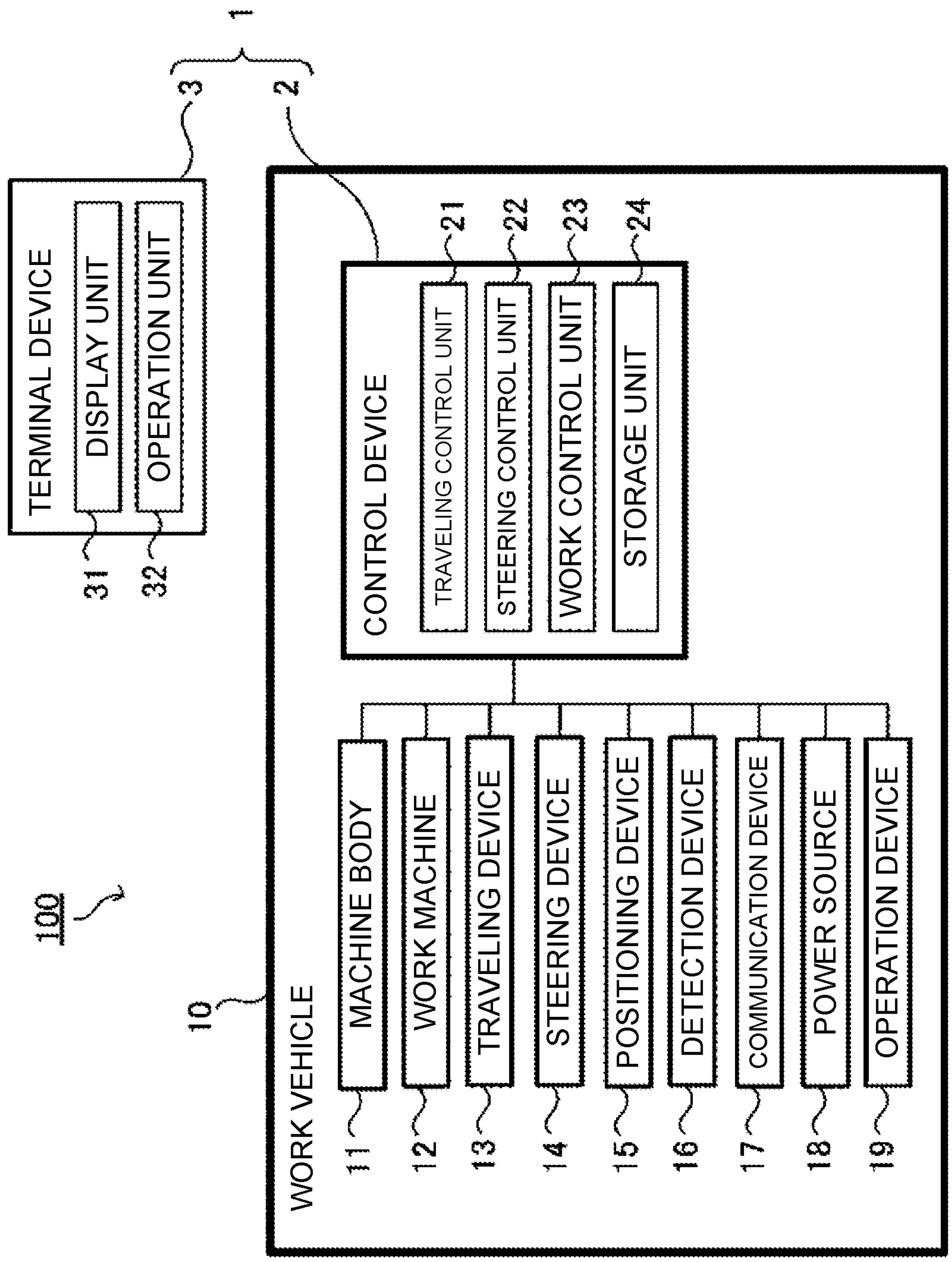
FIG. 2 is a schematic block diagram of a work system according to the first embodiment.

As illustrated in FIG. 2, the work vehicle 10 includes, in addition to the machine body 11 and the work machine 12, the control device 2, a traveling device 13, a steering device 14, the positioning device 15, a detection device 16, a communication device 17, a power source 18, and an operation device 19. The control device 2, the traveling device 13, the steering device 14, the positioning device 15, the detection device 16, the communication device 17, the power source 18, and the operation device 19 are all mounted on the machine body 11.

The machine body 11 has the driving unit 113 (refer to FIG. 1) which a person (operator) can board. The steering wheel 41 (refer to FIG. 3) included in the steering device 14, a speed change lever, the operation device 19, and the like are arranged in the driving unit 113. The steering wheel 41, the speed change lever, the operation device 19, and the like are an operation unit that is operated by the operator. Therefore, the work vehicle 10 is configured to be capable of not only automatically traveling but also manually traveling by a manual operation of the operator. Moreover, as described above, the work machine 12 is detachably connected to the rear side of the machine body 11. A device other than the work machine 12 can also be connected to the machine body 11.

In the present embodiment, since the work machine 12 is a direct-mounted rotary tiller, tilling work can be performed on a field as the target region F1 when the machine body 11 moves forward. A relative position in the up-down direction D1 (relative height) of the work machine 12 with respect to the machine body 11 is variable. Thus, the height of the work machine 12 with reference to a field plane, which is a ground level of the target region F1, is variable. For example, by raising the work machine 12 to a height away from the ground level of the target region F1, the work vehicle 10 can travel even in a non-work state in which work by the work machine 12 is not performed.

The traveling device 13 is a device that causes the work vehicle 10 to travel by driving the drive wheels 112 composed of (a pair of right and left) rear wheels, as illustrated in FIG. 1. The traveling device 13 includes a speed change device, and transmits power generated by the power source 18 to the drive wheels 112 via the speed change device to move the machine body 11 forward or backward. Furthermore, the traveling device 13 includes a brake device, and can also decelerate or stop the machine body 11. In the present embodiment, the drive wheels 112 are normal wheels, but are not limited thereto. For example, the machine body 11 may be a half crawler type machine body in which crawlers (crawler belts) are adopted for the drive wheels 112.

The steering device 14 is a device that steers the steered wheels 111 composed of (a pair of right and left) front wheels, as illustrated in FIG. 1. The steering device 14 includes the steering wheel 41, and steers the steered wheels 111 in response to an operation of the steering wheel 41 by the operator. As illustrated in FIG. 3, the pair of steered wheels 111 is steered by the steering device 14 so as to be inclined leftward or rightward from a reference posture which is a posture facing the front-rear direction D2, that is, a posture in which the rotation axis is along the left-right direction D3 in a plan view. That is, the steering device 14 changes the direction of the pair of steered wheels 111 to steer the steered wheels 111.

FIG. 3 schematically illustrates the movement of the steered wheels 111 in response to the operation of the steering wheel 41. In other words, as illustrated in FIG. 3, when the steering wheel 41 is operated clockwise from a state in which the pair of steered wheels 111 is in the reference posture, the steering device 14 performs steering such that (the front ends of) the pair of steered wheels 111 is inclined to the right, and turns the machine body 11 to the right when the machine body 11 moves forward. In contrast, when the steering wheel 41 is operated counterclockwise from the state in which the pair of steered wheels 111 is in the reference posture, the steering device 14 performs steering such that (the front ends of) the pair of steered wheels 111 is inclined to the left, and turns the machine body 11 to the left when the machine body 11 moves forward. In the present embodiment, the operator operates the steering wheel 41 at the time of manual steering, but the present embodiment is not limited thereto. For example, the operator may operate an operating lever or the like to perform the manual steering.

The traveling device 13 and the steering device 14 enable the machine body 11 to travel in the target region F1 so as to move in the front-rear direction D2 and the left-right direction D3. For example, when the angle of the steered wheels 111 is changed by the steering device 14 in a state where the drive wheels 112 are driven by the traveling device 13 and the machine body 11 travels forward, the machine body 11 turns in the left-right direction D3 to change the traveling direction of the machine body 11.

The positioning device 15 obtains the current position (latitude, longitude, altitude, and the like) of the machine body 11. Specifically, the positioning device 15 is arranged, for example, on a roof of the driving unit 113, and calculates the current position (latitude and longitude) of the machine body 11 using a satellite positioning system such as a global navigation satellite system (GNSS). That is, the positioning device 15 has a positioning antenna for receiving positioning signals from a plurality of satellites 202 (refer to FIG. 1), and calculates the current position on the basis of the positioning signals.

Furthermore, the positioning device 15 includes an inertial sensor, and can also detect a posture such as the current azimuth of the machine body 11.

Moreover, the positioning device 15 adopts a relatively high-precision positioning method such as real time kinematic (RTK) positioning that calculates the current position of the work vehicle 10 using correction information corresponding to a base station 201 (reference station) close to the work vehicle 10. The current position of the machine body 11 may be the same position as the positioning position (the position of the positioning antenna) or may be a position deviated from the positioning position, such as the center position of the machine body 11 in a plan view. As the positioning device 15, for example, a mobile phone terminal, a smartphone, a tablet terminal, or the like may be substituted.

The detection device 16 detects an obstacle in a detection area. The detection device 16 includes an obstacle sensor and a detection processing unit. The obstacle sensor may include various sensors such as a camera (image sensor), a sonar sensor, a human detecting sensor, a radar, or a light detection and ranging (LiDAR). The obstacle sensor may be a 3D sensor that measures a distance to an object (obstacle) by a time of flight (TOF) method in which a distance to a distance measurement point is measured on the basis of round-trip time for light or sound to reach the distance measurement point and return from the distance measurement point. The detection processing unit detects an obstacle on the basis of measurement information acquired from the obstacle sensor. The detection processing unit may detect only the presence or absence of an obstacle, or may detect the position, shape, number, attribute (including type), or the like of an obstacle.

A detection result of the detection device 16 is output to the control device 2. When the detection device 16 detects an obstacle at least while the work vehicle 10 automatically travels, the control device 2 outputs a warning (including notification by sound and/or light), and executes obstacle avoidance processing (including detouring, decelerating, stopping, or the like) by controlling the traveling device 13 and the steering device 14. Furthermore, the control device 2 may output to and display on the terminal device 3 position information of the obstacle, an execution history of the avoidance processing, and the like.

The communication device 17 is a communication interface that connects the work vehicle 10 (the control device 2, the positioning device 15, and the like) to an external device by wire or wirelessly so as to execute data communication in accordance with a predetermined communication protocol with the external device. In the present embodiment, the communication device 17 can communicate with at least the terminal device 3 which is an external device. As the communication device 17, for example, a mobile phone terminal, a smartphone, a tablet terminal, or the like may be substituted.

The power source 18 is a drive source that supplies power at least to the traveling device 13. The power source 18 has an engine such as a diesel engine, for example. Furthermore, the power source 18 drives a hydraulic pump to supply hydraulic oil from the hydraulic pump to a hydraulic cylinder or the like of a power steering mechanism 43 (refer to FIG. 4) of the steering device 14. That is, the power source 18 is configured to be able to supply power to the power steering mechanism 43 as well.

The operation device 19 is a device that receives an operation of the operator. For example, the operation device 19 can receive a switching operation between an automatic steering mode in which the steered wheels 111 are automatically steered and a manual steering mode in which the steered wheels 111 are manually steered. The operation device 19 outputs a signal corresponding to the received operation to the control device 2.

The control device 2 is mainly configured by a computer system having one or more processors, such as a central processing unit (CPU), and one or more memories, such as a read only memory (ROM) and a random access memory (RAM), and executes various types of processing (information processing). In the present embodiment, since the control device 2 is mainly configured by the computer system having one or more processors, the control device 2 is realized when the one or more processors execute a work vehicle control program. In the present embodiment, the control device 2 is an integrated controller that controls the entire work vehicle 10, and includes, for example, an electronic control unit (ECU). However, the control device 2 may be provided separately from the integrated controller.

The control device 2 is configured to be able to communicate with devices provided in respective parts of the machine body 11. That is, the work machine 12, the traveling device 13, the steering device 14, the positioning device 15, the detection device 16, the communication device 17, the power source 18, the operation device 19, and the like are electrically connected to the control device 2. Thus, the control device 2 can control the work machine 12, the traveling device 13, the steering device 14, and the like, and can acquire the output of the positioning device 15, the detection device 16, the operation device 19, and the like. The control device 2 may transmit and receive various types of information (data) directly to and from the respective devices or indirectly through a relay or the like.

In the present embodiment, as illustrated in FIG. 2, the control device 2 includes a traveling control unit 21, a steering control unit 22, a work control unit 23, and a storage unit 24.

The traveling control unit 21 controls the traveling device 13 and the power source 18. At least during the autonomous traveling, the traveling control unit 21 controls the traveling device 13 and the power source 18 instead of the operator such that the vehicle speed, the engine rotation number, and the like approach target values. Moreover, the traveling control unit 21 can also decelerate or stop the machine body 11 by controlling the brake device of the traveling device 13.

The steering control unit 22 controls the steering device 14. The steering control unit 22 has an automatic steering mode and a manual steering mode as action modes, and is configured to be able to switch between the automatic steering mode and the manual steering mode. The manual steering mode is a mode in which the operator operates the steering wheel 41 to perform steering. At least during the autonomous traveling or the semi-automatic traveling, the steering control unit 22 acts in the automatic steering mode and controls the steering device 14 instead of the operator such that the steering angle of the steered wheels 111 approaches a target steering angle.

In particular, during the autonomous traveling, the steering control unit 22, together with the traveling control unit 21, executes control of the work vehicle 10 on the basis of the current position of the machine body 11 such that the machine body 11 travels along the target route. The target route for causing the work vehicle 10 to autonomously travel is generated in the terminal device 3, for example. In other words, the work vehicle 10 acquires route data corresponding to the target route from the terminal device 3, and autonomously travels in accordance with the target route. The steering control unit 22 will be described in more detail in the section "[4] Configuration related to Steering Device."

The work control unit 23 controls the work machine 12. At least during the autonomous traveling, the traveling control unit 21 executes control of the work machine 12 on the basis of the current position of the machine body 11 on the target route. Specifically, when the work vehicle 10 travels on a work route, for which work by the work machine 12 is performed, in the target route, the work control unit 23 sets the work machine 12 at a work position and performs the work by the work machine 12. In contrast, when the work vehicle 10 travels on a non-work route, for which the work by the work machine 12 is not performed, in the target route, the work control unit 23 lifts the work machine 12 to a non-work position and stops the work by the work machine 12.

The storage unit 24 is a non-volatile memory or the like that stores the work vehicle control program and various types of data such as target route information related to the target route. That is, for example, the traveling control unit 21 and the steering control unit 22 can cause the work vehicle 10 to execute the autonomous traveling along the target route on the basis of the target route information stored in the storage unit 24.

In addition to the above-described configuration, the work vehicle 10 further includes a battery, a fuel tank, a display device, and various sensors. For example, the battery supplies electric power for action to respective parts of the work vehicle 10 such as the control device 2. In particular, electronic devices such as the control device 2, the steering device 14, the positioning device 15, the detection device 16, and the communication device 17 act by the power supply from the battery, and thus can act even when the power source 18 is stopped. The display device is a user interface for presenting information to a user (operator), such as a liquid-crystal display or an organic EL display that displays various types of information.

[3] Configuration of Terminal Device

Next, a configuration of the terminal device 3 according to the present embodiment will be described in detail with reference to FIG. 1 and FIG. 2.

In the present embodiment, the terminal device 3 can communicate with the work vehicle 10 as described above, and configures the control system 1 together with the control device 2 of the work vehicle 10. That is, components of the control system 1 are dispersedly provided in at least the work vehicle 10 and the terminal device 3. However, the present embodiment is not limited to this configuration. For example, the function of the terminal device 3 may be provided in the control device 2, and in this case, the components of the control system 1 are realized only by the control device 2.

In the present embodiment, as an example, the terminal device 3 is configured by a general-purpose terminal such as a tablet terminal, a smartphone, or a laptop computer. As illustrated in FIG. 1, the terminal device 3 is arranged in the driving unit 113 of the machine body 11. Dedicated application software (program) is installed in the terminal device 3 configured by a general-purpose terminal, and the terminal device 3 functions as the terminal device 3 of the control system 1 by activating the application software.

The terminal device 3 includes a display unit 31 and an operation unit 32. The display unit 31 includes, for example, a liquid-crystal display or an organic EL display. The operation unit 32 includes, for example, a touch panel, a physical switch, a mouse, or a keyboard. In the present embodiment, as an example, the display unit 31 configured by a liquid-crystal display and the operation unit 32 configured by a touch panel are integrated to configure a touch panel display. Thus, when the operation unit 32 is operated in a state where a display screen is displayed on the display unit 31, the terminal device 3 can receive a user operation on the display screen.

The terminal device 3 is used for inputting various settings related to the action of the work vehicle 10 and outputting a control signal related to the control of the work vehicle 10.

Specifically, the terminal device 3 has a function of setting (registering) various types of information related to the control of the work vehicle 10, such as a target route for automatic traveling of the work vehicle 10. That is, the operator can set the target route or the like by operating the operation unit 32 on the display screen displayed on the display unit 31. Information such as the target route set here is transmitted directly or indirectly to the work vehicle 10, and is used for the automatic traveling of the work vehicle 10.

Furthermore, the terminal device 3 is configured to be able to operate the work vehicle 10 by outputting (transmitting) a control signal for stopping at least the automatic traveling of the work vehicle 10 to the work vehicle 10 in response to the operation of the operator.

Moreover, the terminal device 3 can display various types of information related to the action of the work vehicle 10, such as the current position, the current azimuth, and the (spraying) work situation of the work vehicle 10, on the display unit 31 while the work vehicle 10 automatically travels. As an example, the terminal device 3 displays, on the display unit 31, a monitoring screen that displays the current position or the like of the work vehicle 10 together with the target route on a map that simulates the target region F1, and thus, the operator can visually grasp the situation of the work vehicle 10.

[4] Configuration Related to Steering Device

Next, a configuration related to the steering device 14 will be described in detail with reference to FIG. 3 and FIG. 4. FIG. 4 schematically illustrates that the steered wheels 111 are steered by the configuration related to the steering device 14 (the steering device 14, the steering control unit 22, and the storage unit 24).

As described above, the steering device 14 is a device that steers the steered wheels 111 composed of the pair of right and left front wheels, and changes the direction of the steered wheels 111, that is, a steering angle θ1, in response to at least the operation of the steering wheel 41 by the operator. As illustrated in FIG. 3, the steering angle θ1 is an inclination angle of the steered wheels 111 with respect to the reference posture. That is, when the steered wheels 111 are in the reference posture along the front-rear direction D2 (the state illustrated in the center of FIG. 3), the steering angle θ1 is 00.

When the steering wheel 41 is operated in this state, the steering device 14 tilts the steered wheels 111 by the steering angle θ1 corresponding to the operation amount of the steering wheel 41 in the operation direction of the steering wheel 41. In short, in the manual steering mode, the steering angle θ1 changes in accordance with the operation of the steering wheel 41. In the present embodiment, as an example, the steering angle θ1 when the steered wheels 111 are inclined rightward from the reference posture (the state illustrated on the right side of FIG. 3) is defined as "positive," and the steering angle θ1 when the steered wheels 111 are inclined leftward from the reference posture (the state illustrated on the left side of FIG. 3) is defined as "negative." Furthermore, in the present embodiment, as an example, it is assumed that the steering angles θ1 of the left front wheel and the right front wheel which are the pair of steered wheels 111 are the same.

In the present embodiment, as illustrated in FIG. 4, the steering device 14 further includes, in addition to the steering wheel 41, a steering operation unit 42, the power steering mechanism 43, a steering angle sensor 44, and a stopper mechanism 45.

The power steering mechanism 43 is a mechanism that steers the pair of steered wheels 111 in conjunction with the operation of the steering wheel 41 at least in the manual steering mode. That is, when the operator operates the steering wheel 41, the power steering mechanism 43 amplifies the operation force to actually steer the pair of steered wheels 111. In the present embodiment, as an example, the power steering mechanism 43 is of a hydraulic type, and a hydraulic actuator such as a hydraulic cylinder drives the pair of steered wheels 111. Thus, the amplification factor of the operation force by the power steering mechanism 43 varies in accordance with the engine rotation number of the power source 18. Therefore, for example, when the engine rotation number decreases, the amplification factor of the operation force by the power steering mechanism 43 also decreases, the force necessary for the operation of the steering wheel 41 becomes large, and (the operation feeling of) the steering wheel 41 becomes heavy.

The steering operation unit 42 is a device for steering the pair of steered wheels 111 instead of the operation of the steering wheel 41 in the automatic steering mode. The steering operation unit 42 includes the motor 421 and a motor driver 422.

The motor 421 is an electric motor that is driven in response to a drive signal (electric signal) from the motor driver 422.

The output of the motor 421 is applied to the power steering mechanism 43. Thus, the steering operation unit 42 can activate the power steering mechanism 43 by the motor 421 and steer the pair of steered wheels 111 instead of the operation of the steering wheel 41.

The motor driver 422 drives the motor 421 by outputting a drive signal to the motor 421. The motor driver 422 receives a command value from (an automatic steering processing unit 53 of) the steering control unit 22 and drives the motor 421 in accordance with the command value. Examples of the "command value" include a speed command value related to the rotation number (rotation speed) of the motor 421, a current command value related to a driving current of the motor 421, a torque command value related to torque of the motor 421, and a position command value related to a rotational position of the motor 421. For example, the motor driver 422 receives a speed command value and performs speed control of the motor 421 such that the rotation number (rotation speed) of the motor 421 approaches the speed command value.

The motor driver 422 can rotate the motor 421 in both directions, and can drive the motor 421 at an arbitrary rotation number (rotation speed). In the present embodiment, as an example, the steering angle θ1 of the steered wheels 111 changes in a positive direction (i.e., rightward) when the motor 421 rotates forward, and the steering angle θ1 of the steered wheels 111 changes in a negative direction (i.e., leftward) when the motor 421 rotates backward. Therefore, the steering operation unit 42 can steer the pair of steered wheels 111 to an arbitrary steering angle θ1 via the power steering mechanism 43, similarly to the operation of the steering wheel 41 by the operator.

The steering angle sensor 44 is a sensor that detects the current steering angle θ1 of the pair of steered wheels 111. The steering angle sensor 44 is configured by using, for example, a potentiometer, and outputs a steering angle signal corresponding to the steering angle θ1 to the steering control unit 22 of the control device 2 regularly or irregularly. In the present embodiment, as described above, since the steering angles θ1 of the left front wheel and the right front wheel which are the pair of steered wheels 111 are the same, the steering angle sensor 44 detects the steering angle θ1 of any one of the pair of steered wheels 111.

The stopper mechanism 45 is a mechanism that limits a movable range of the pair of steered wheels 111. That is, the steering angle θ1 of the pair of steered wheels 111 cannot be infinitely changed, and the pair of steered wheels 111 can be steered only up to the maximum turning angle. The term "maximum turning angle" in the present disclosure means how much the steered wheels 111 can be angled with respect to the front-rear direction D2. When the (pair of) steered wheels 111 are turned (inclined) from the reference posture to the maximum turning angle, the steered wheels 111 cannot be physically turned (inclined) anymore, and the maximum turning angle is a physical upper limit value of the steering angle θ1. In the present disclosure, a state where the steered wheels 111 are steered to the maximum turning angle is referred to as a "fully turned state."

Since the steered wheels 111 can be steered in both a positive direction (i.e., rightward) of the steering angle θ1 from the reference posture and a negative direction (i.e., leftward) of the steering angle θ1 from the reference posture, there are positive and negative maximum turning angles. Therefore, the steering angle θ1 of the pair of steered wheels 111 can be changed within a range from a leftward maximum turning angle (negative steering angle θ1) in a left fully turned state to a rightward maximum turning angle (positive steering angle θ1) in a right fully turned state.

As an example, the stopper mechanism 45 has an adjustment bolt mounted near the axis of the steered wheel 111, and the maximum turning angle can be adjusted by the length of the adjustment bolt. A person turns the adjustment bolt to adjust the length of the adjustment bolt, so that the stopper mechanism 45 can adjust the maximum turning angle to a desired maximum turning angle. The stopper mechanism 45 has an adjustment bolt for adjusting the leftward maximum turning angle and an adjustment bolt for adjusting the rightward maximum turning angle, and these adjustment bolts can be individually adjusted. Thus, the left maximum turning angle and the right maximum turning angle can be defined individually.

As described above, in the present embodiment, the maximum turning angle is defined by the stopper mechanism 45 that limits the movable range of the steered wheels 111. Thus, steering of the steered wheels 111 beyond the movable range can be physically limited by the stopper mechanism 45, and the load applied to the steering device 14 can be suppressed to be small. In particular, as in the present embodiment, since a person can adjust the maximum turning angle by operating the stopper mechanism 45, a desired maximum turning angle can be set in accordance with the usage of the work vehicle 10, the target region F1, and the like.

Moreover, in the present embodiment, as illustrated in FIG. 4, the steering control unit 22 that controls the steering device 14 includes an acquisition processing unit 51, a mode switching processing unit 52, the automatic steering processing unit 53, an override determination processing unit 54, a condition change processing unit 55, a turning angle determination processing unit 56, and a maximum angle setting processing unit 57.

The acquisition processing unit 51 executes acquisition processing of acquiring an electric signal (including data) from each device. In the present embodiment, the acquisition processing unit 51 acquires at least a steering angle signal from the steering angle sensor 44. Furthermore, the acquisition processing unit 51 acquires information related to a drive state of the motor 421, such as torque, the rotation number (rotation speed), and a current, from the steering operation unit 42.

The mode switching processing unit 52 executes mode switching processing of switching the action mode (of the work vehicle 10) between the manual steering mode and the automatic steering mode. The mode switching processing unit 52 basically switches the action mode from the manual steering mode to the automatic steering mode at the start of the automatic traveling (including the autonomous traveling and the semi-automatic traveling), and switches the action mode from the automatic steering mode to the manual steering mode at the end of the automatic traveling.

Furthermore, when the work vehicle 10 is determined to be in an override state described below, the mode switching processing unit 52 switches the action mode of the work vehicle 10 from the automatic steering mode to the manual steering mode in which the operator performs manual steering.

The override state is a state where input is applied to the power steering mechanism 43 from both the steering operation unit 42 and the steering wheel 41 by, for example, operating the steering wheel 41 during the action in the automatic steering mode. When such an override state is caused, the mode switching processing unit 52 forcibly switches the action mode from the automatic steering mode to the manual steering mode even if the automatic traveling is continued.

Therefore, the operator can forcibly terminate the automatic steering mode only by operating the steering wheel 41 during the action in the automatic steering mode, thereby improving the operability.

The automatic steering processing unit 53 executes automatic steering processing of controlling the motor 421 in the automatic steering mode. The automatic steering processing unit 53 controls (the motor 421 of) the steering device 14 such that the steering angle θ1 of the steered wheels 111 approaches a target steering angle. In the present embodiment, as an example, the automatic steering processing unit 53 outputs a command value such as a speed command value to the motor driver 422 of the steering operation unit 42, and controls the motor 421 by causing the motor driver 422 to drive the motor 421 in accordance with the command value. In the automatic steering mode, the automatic steering processing unit 53 steers the pair of steered wheels 111 as needed and adjusts the steering angle θ1 as needed such that the work vehicle 10 travels along the target route.

In the automatic steering mode, the override determination processing unit 54 executes override determination processing of determining whether the work vehicle 10 is in the override state. The override determination processing unit 54 determines whether the work vehicle 10 is in the override state on the basis of a determination condition related to torque generated in the motor 421. As an example, in a case where torque exceeding a threshold value is generated in the motor 421 for a certain period of time, the operation of the steering wheel 41 by the operator is estimated. Thus, in such a case, the override determination processing unit 54 determines that the determination condition is satisfied, and determines that the work vehicle 10 is in the override state.

The condition change processing unit 55 executes condition change processing of changing the determination condition. The term "determination condition" mentioned here is a condition used for determining whether the work vehicle 10 is in the override state in the override determination processing unit 54. That is, in the present embodiment, the "determination condition" used for determination of the override state is not fixed, but can be changed by the condition change processing unit 55.

In the automatic steering mode, the turning angle determination processing unit 56 executes turning angle determination processing of determining whether the steered wheels 111 are in the fully turned state. The turning angle determination processing unit 56 determines whether the steered wheels 111 are in the fully turned state in which the steered wheels 111 are steered to the maximum turning angle on the basis of a turning angle determination condition. As an example, when a state where the steering angle θ1 is equal to or more than a predetermined angle (an angle at which the stopper mechanism 45 can act), the steering angle θ1 hardly changes, torque equal to or more than a predetermined value is generated in the motor 421, and the direction of the torque coincides with the command value is continued for a certain period of time, steering of the steered wheels 111 to the maximum turning angle is estimated. Thus, in such a case, the turning angle determination processing unit 56 determines that the turning angle determination condition is satisfied, and determines that the steered wheels 111 are in the fully turned state. The "turning angle determination condition" is a condition different from the "determination condition" used for determining whether the work vehicle 10 is in the override state, and is a condition fixedly defined in advance in the present embodiment.

The maximum angle setting processing unit 57 executes maximum angle setting processing of setting a maximum steering angle in the automatic steering. The maximum angle setting processing unit 57 sets the maximum steering angle on the basis of the steering angle θ1 of the steered wheels 111 when the steered wheels 111 are determined to be in the fully turned state by the turning angle determination processing.

The term "maximum steering angle" in the present disclosure is an angle that is the maximum value of the target steering angle in the automatic steering processing in which the automatic steering processing unit 53 controls (the motor 421 of) the steering device 14 in the automatic steering mode.

That is, during the automatic steering, the steering angle θ1 is controlled within a range equal to or less than the maximum steering angle.

The maximum angle setting processing unit 57 sets the maximum steering angle by storing (writing) the value of the maximum steering angle in the storage unit 24 of the control device 2. The storage unit 24 includes a left maximum angle storage region 241 and a right maximum angle storage region 242 that store the maximum steering angle set by the maximum angle setting processing unit 57. The left maximum angle storage region 241 stores a negative direction, that is, leftward maximum steering angle set by the maximum angle setting processing unit 57. The right maximum angle storage region 242 stores a positive direction, that is, rightward maximum steering angle set by the maximum angle setting processing unit 57.

As described above, in the present embodiment, the maximum steering angle is individually set for each of steering directions (leftward and rightward) of the steered wheels 111. Thus, an appropriate maximum steering angle based on the steering angle θ1 in the fully turned state is set as compared with a case where the maximum steering angle is collectively set regardless of the steering direction.

[5] Control Method of Work Vehicle

An example of a control method of the work vehicle 10 (hereinafter, simply referred to as "control method") executed mainly by the control system 1 will be described with reference to FIG. 5 to FIG. 15.

The control method according to the present embodiment is executed by the control system 1 that is mainly configured by a computer system, and thus, in other words, is embodied by a work vehicle control program (hereinafter, simply referred to as "control program"). That is, the control program according to the present embodiment is a computer program that causes one or more processors to execute each processing related to the control method.

When a specific start operation set in advance for executing the control program is performed, the control system 1 executes the following various types of processing related to the control method. The start operation is, for example, an ON operation of a key switch for starting an engine (the power source 18) and/or an activation operation of an application program (the work vehicle control program) in the terminal device 3. In contrast, when a specific end operation set in advance is performed, the control system 1 ends the following various types of processing related to the control method. The end operation is, for example, an OFF operation of the key switch and/or an end operation of the application program (the work vehicle control program) in the terminal device 3.

[5.1] Automatic Traveling Method

Figure 5:
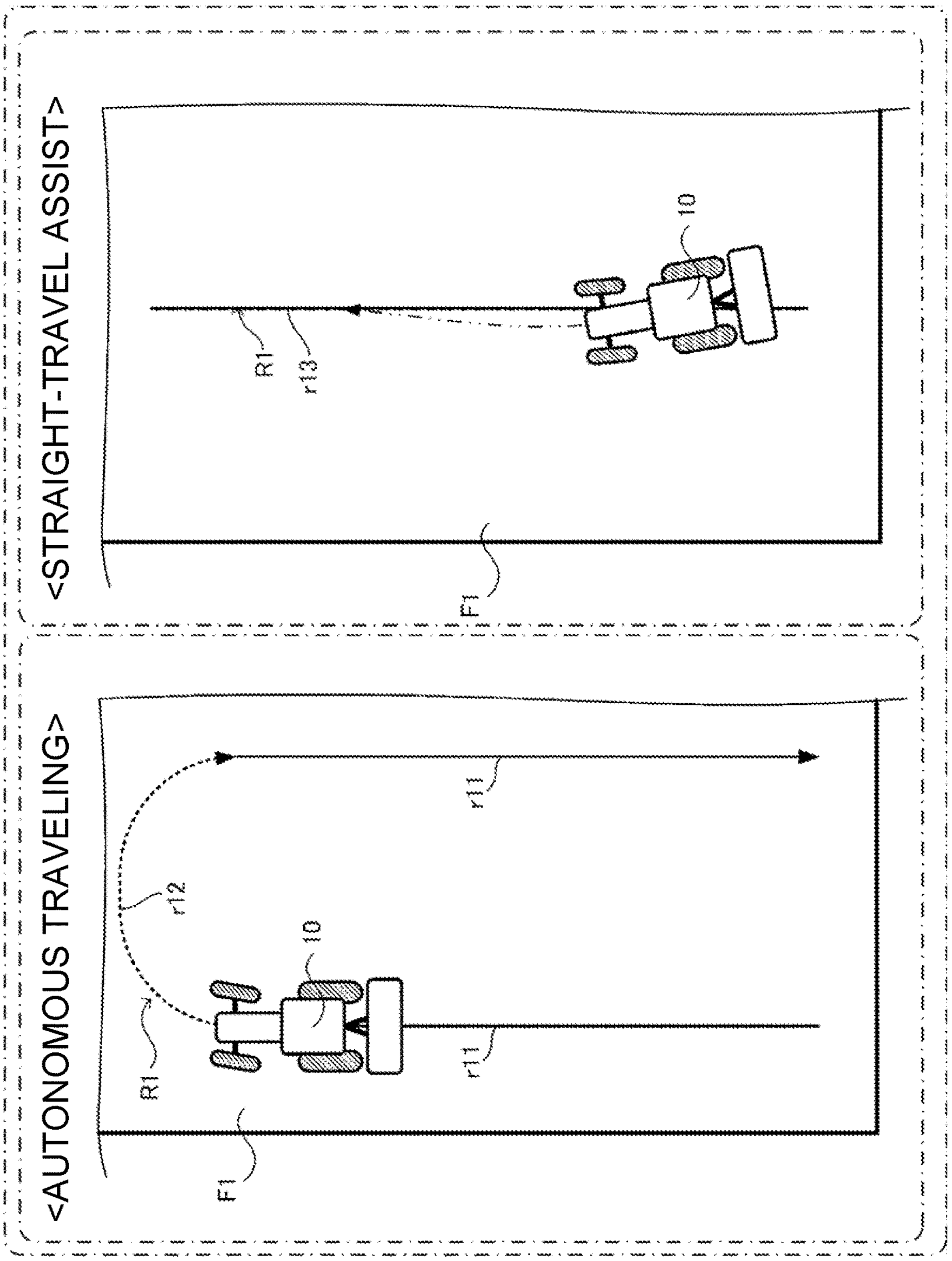
FIG. 5 is a schematic view explaining automatic traveling in the work system according to the first embodiment.

First, a method of causing the work vehicle 10 to automatically travel (including the autonomous traveling and the semi-automatic traveling) in the control system 1 according to the present embodiment will be described with reference to FIG. 5. FIG. 5 schematically illustrates a target route R1 generated in the target region F1 and the work vehicle 10 in a plan view. In FIG. 5, a route on which the work vehicle 10 performs work (work route r11) is indicated by a solid line, and a route on which the work vehicle 10 does not perform work (non-work route r12) is indicated by a dotted line.

The left side of FIG. 5 illustrates an example of autonomous traveling in which the work vehicle 10 autonomously travels without depending on the operation of the operator. In the autonomous traveling, the control system 1 causes the work vehicle 10 to automatically travel along the target route R1 generated in the target region F1 formed of a field. In the example of FIG. 5, the target route R1 includes a plurality of straight work routes r11 and a non-work route r12 formed of a turning route that connects adjacent work routes r11. In this case, the control system 1 controls the traveling device 13, the steering device 14, and the power source 18 in the traveling control unit 21 and the steering control unit 22 to cause the work vehicle 10 to travel along the target route R1. Furthermore, the control system 1 controls the work machine 12 in the work control unit 23, and the work by the work machine 12 is performed only in the work routes r11 of the target route R1.

In this example, at least when the work vehicle 10 travels on the non-work route r12 formed of a turning route, the steering control unit 22 controls the steering device 14 to change the steering angle θ1 of the steered wheels 111 so as to cause the work vehicle 10 to turn and travel along the non-work route r12.

The right side of FIG. 5 illustrates an example of straight-travel assist (semi-automatic traveling) in which only steering is automated. In the straight-travel assist, the control system 1 causes the work vehicle 10 to travel along the target route R1 formed of a straight route r13 parallel to a reference line in the target region F1 formed of a field. In this case, the control system 1 controls the steering device 14 in the steering control unit 22 to maintain being on the straight route r13.

In this example, at least when the work vehicle 10 is deviated from the straight route r13, the steering control unit 22 controls the steering device 14 to change the steering angle θ1 of the steered wheels 111 so as to return the work vehicle 10 to the straight route r13.

[5.2] Turning Angle Determination Processing

Next, processing related to the turning angle determination processing in the control method according to the present embodiment will be described with reference to FIG. 6 and FIG. 7.

As described above, in the automatic steering mode, the turning angle determination processing unit 56 executes the turning angle determination processing of determining whether the steered wheels 111 are in the fully turned state on the basis of the turning angle determination condition. In the present embodiment, the leftward maximum turning angle and the rightward maximum turning angle are individually adjusted by the stopper mechanism 45, and, in the turning angle determination processing, a leftward fully turned state (referred to as "left fully turned state") and a rightward fully turned state (referred to as "right fully turned state") are respectively determined.

In the present embodiment, as an example, the turning angle determination condition includes a first requirement, a second requirement, a third requirement, a fourth requirement, and a fifth requirement, and the turning angle determination processing unit 56 determines that the steered wheels 111 are in the fully turned state only when all of the first to fifth requirements are satisfied. That is, when any one of the first to fifth requirements is not satisfied, the turning angle determination processing unit 56 determines that the steered wheels 111 are not in the fully turned state.

The first requirement is that the absolute value of the steering angle θ1 detected by the steering angle sensor 44 is equal to or more than a threshold angle. Specifically, the threshold angle in the first requirement is an angle at which the stopper mechanism 45 can act, and is "25°" as an example. The second requirement is that the steering angle θ1 hardly changes for a predetermined time. Specifically, the second requirement is that the amount of change in the output of the steering angle sensor 44 acquired in the acquisition processing unit 51 is equal to or less than a certain angle (0.5° as an example) at a predetermined number of sampling timings (acquisition timings of the steering angle signals).

The third requirement is that torque equal to or more than a predetermined value is generated in the motor 421. Specifically, the predetermined value in the third requirement is a torque value that does not occur in general automatic steering, and is "8 Nm" as an example. The fourth requirement is that the direction of the torque generated in the motor 421 coincides with the command value. Specifically, the fourth requirement is that the sign (+/−) of the torque generated in the motor 421 coincides with the forward rotation/backward rotation of the motor 421 in the command value (the speed command value or the like).

The fifth requirement is that the first requirement, the second requirement, the third requirement, and the fourth requirement are continued for a certain period of time. The certain period of time in the fifth requirement is "0.1 sec" as an example. In short, the turning angle determination processing unit 56 determines that the steered wheels 111 are in the fully turned state when a state where all of the above-described first to fourth requirements are satisfied is continued for the certain period of time (the fifth requirement).

Figure 6:
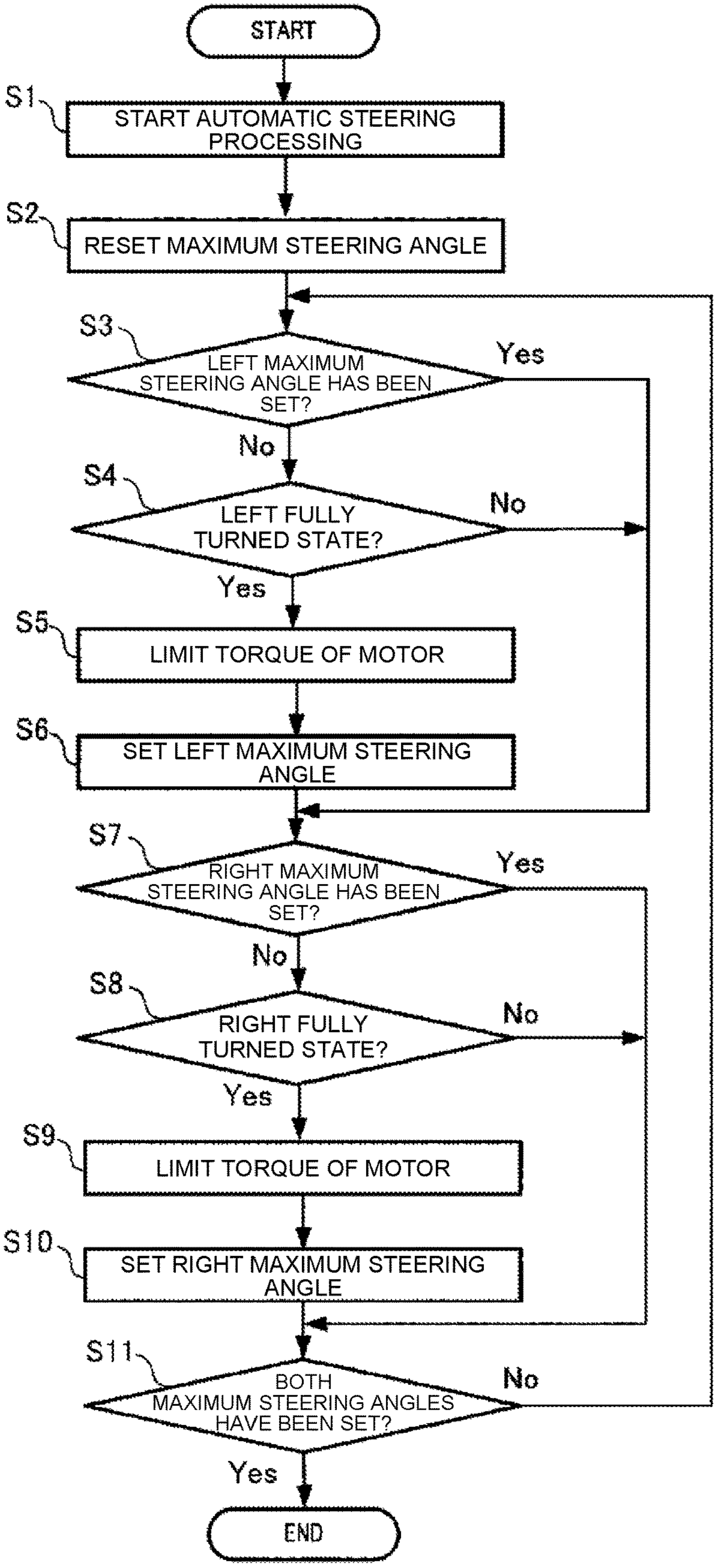
FIG. 6 is a flowchart illustrating an example of processing related to turning angle determination processing in a control method of the work vehicle according to the first embodiment.
Figure 7:
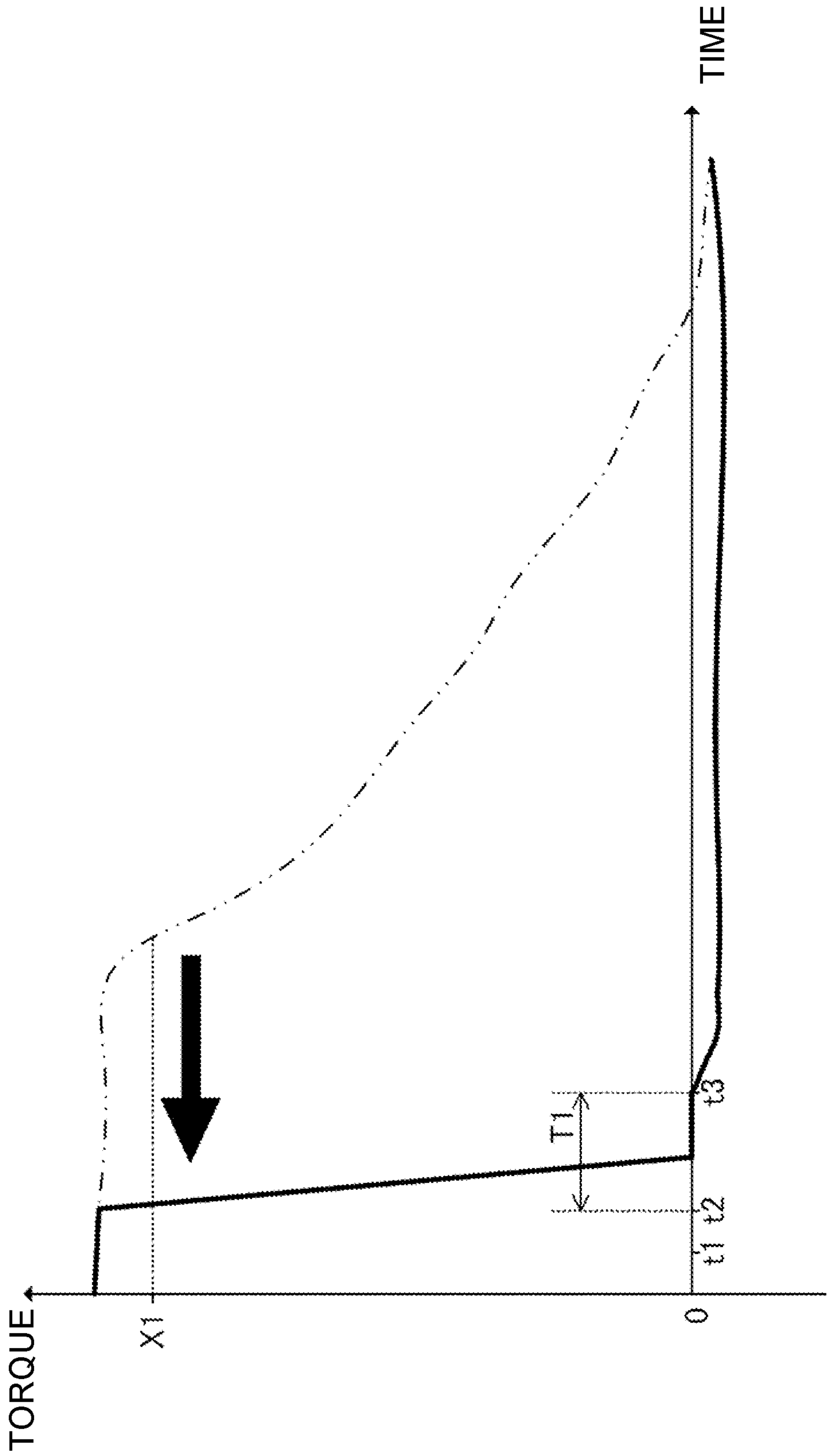
FIG. 7 is a graph illustrating an example of a change in torque of a motor by the control method of the work vehicle according to the first embodiment.

FIG. 6 is a flowchart illustrating an example of the processing related to the turning angle determination processing. The control method according to the present embodiment performs processing illustrated in FIG. 6 each time the automatic steering mode is started.

In other words, the mode switching processing unit 52 switches the action mode from the manual steering mode to the automatic steering mode at the start of the automatic traveling (including the autonomous traveling and the semi-automatic traveling). When the automatic steering mode is started, the automatic steering processing unit 53 starts automatic steering processing (S1). Then, the maximum angle setting processing unit 57 resets the maximum steering angle that has been set (has been stored in the storage unit 24) (S2).

In next step S3, the turning angle determination processing unit 56 determines whether the leftward maximum steering angle (referred to as "left maximum steering angle") has been set. At this time, when the left maximum steering angle is stored in the left maximum angle storage region 241, the turning angle determination processing unit 56 determines that the left maximum steering angle has been set (S3: Yes), skips processing related to determination of the left fully turned state (S4 to S6), and shifts the processing to step S7. In contrast, when the left maximum steering angle is not stored in the left maximum angle storage region 241, the turning angle determination processing unit 56 determines that the left maximum steering angle has not been set (S3: No), and shifts the processing to step S4.

In step S4, the turning angle determination processing unit 56 determines whether the steered wheels 111 are in the left fully turned state on the basis of the turning angle determination condition. For example, in the first requirement of the turning angle determination condition, the determination of the left fully turned state is limited to the negative steering angle θ1.

That is, a predetermined angle in the first requirement is set to "−25°," and the first requirement is satisfied when the steering angle θ1 is equal to or less than "−25°." At this time, when the turning angle determination condition is satisfied, the turning angle determination processing unit 56 determines that the steered wheels 111 are in the left fully turned state (S4: Yes), and shifts the processing to step S5. When the turning angle determination condition is not satisfied, the turning angle determination processing unit 56 determines that the steered wheels 111 are not in the left fully turned state (S4: No), and shifts the processing to step S7.

In step S5, the automatic steering processing unit 53 executes processing of limiting the torque of the motor 421 over a limited period. Specifically, the automatic steering processing unit 53 basically performs the speed control of the motor 421 by the speed command value, but drives the motor 421 by current control in which the current command value is set to "0 A" over the limited period. The limited period is a period of a certain time length (0.006 sec as an example) immediately after the steered wheels 111 are determined to be in the fully turned state. Thus, since the motor 421 is driven by the current control in which the current command value is set to “0 A” for the certain period of time immediately after the steered wheels 111 are determined to be in the left fully turned state, the torque generated in the motor 421 is limited.

In next step S6, the maximum angle setting processing unit 57 sets the left maximum steering angle on the basis of the steering angle θ1 detected by the steering angle sensor 44 at the time point of step S4. That is, the maximum angle setting processing unit 57 obtains the left maximum steering angle on the basis of the steering angle θ1 of the steered wheels 111 when the steered wheels 111 are determined to be in the left fully turned state, and sets the left maximum steering angle by storing the left maximum steering angle in the left maximum angle storage region 241 of the storage unit 24.

In next step S7, the turning angle determination processing unit 56 determines whether the rightward maximum steering angle (referred to as “right maximum steering angle”) has been set. At this time, when the right maximum steering angle is stored in the right maximum angle storage region 242, the turning angle determination processing unit 56 determines that the right maximum steering angle has been set (S7: Yes), skips processing related to determination of the right fully turned state (S8 to S10), and shifts the processing to step S11. In contrast, when the right maximum steering angle is not stored in the right maximum angle storage region 242, the turning angle determination processing unit 56 determines that the right maximum steering angle has not been set (S7: No), and shifts the processing to step S8.

In steps S8 to S10, the same processing as that performed for the “left fully turned state” and the “left maximum steering angle” in steps S4 to S6 is performed for the “right fully turned state” and the “right maximum steering angle.” In other words, for example, in step S8, a predetermined angle in the first requirement is set to “25°,” and the first requirement is satisfied when the steering angle θ1 is equal to or more than “25°.” At this time, when the turning angle determination condition is satisfied, the turning angle determination processing unit 56 determines that the steered wheels 111 are in the right fully turned state (S8: Yes), and shifts the processing to step S9. When the turning angle determination condition is not satisfied, the turning angle determination processing unit 56 determines that the steered wheels 111 are not in the right fully turned state (S8: No), and shifts the processing to step S11.

In next step S11, the turning angle determination processing unit 56 determines whether both the left maximum steering angle and the right maximum steering angle have been set. That is, when the left maximum steering angle is stored in the left maximum angle storage region 241 (S3: Yes) and the right maximum steering angle is stored in the right maximum angle storage region 242 (S7: Yes), the turning angle determination processing unit 56 determines that the maximum steering angles have been set (S1*l*: Yes), and ends a series of processing related to the turning angle determination processing. In contrast, when any one of the left maximum steering angle and the right maximum steering angle has not been set (S11: No), the turning angle determination processing unit 56 returns the processing to step S3.

The control system 1 executes the processing of steps S1 to S11 described above each time the automatic steering mode is started. However, the flowchart illustrated in FIG. 6 is merely an example, and the processing may be added or omitted as appropriate, or the order of the processing may be changed as appropriate.

As described above, in the automatic steering mode, the control method according to the present embodiment includes executing the turning angle determination processing of determining whether the steered wheels 111 are in the fully turned state in which the steered wheels 111 are steered to the maximum turning angle on the basis of the turning angle determination condition. Therefore, for example, in a case where the steered wheels 111 are determined to be in the fully turned state, if automatic steering by which the steering angle θ1 is further increased is not performed, the steered wheels 111 can be prevented from being automatically steered beyond the fully turned state. Therefore, a defect in which excessive torque is generated in the motor 421 due to the automatic steering of the steered wheels beyond the fully turned state, and the automatic steering is canceled due to the determination of the override state is less likely to occur. Furthermore, since a threshold value of the torque for the determination of the override state does not need to be set to be large so as to avoid the above-described defect, problems in which the motor 421 is damaged due to a prolonged situation in which the excessive torque is generated in the motor 421 and relatively large force is required for the operation of the steering wheel 41 for switching to the manual steering can be solved.

The turning angle determination condition includes a torque condition (the third requirement and the fourth requirement) related to the torque of the motor 421. Therefore, for example, as compared with a case where whether the steered wheels 111 are in the fully turned state is determined only by the first requirement and the second requirement related to the steering angle θ1, erroneous determination in which the steered wheels 111 are in the fully turned state is less likely to occur.

Moreover, the turning angle determination condition includes a change rate condition (the second requirement) related to a change rate of the steering angle θ1 of the steered wheels 111. Therefore, for example, as compared with a case where whether the steered wheels 111 are in the fully turned state is determined only by the third requirement and the fourth requirement related to the torque of the motor 421, erroneous determination in which the steered wheels 111 are in the fully turned state is less likely to occur.

Moreover, the turning angle determination condition includes the absolute value of the steering angle θ1 of the steered wheels 111 being equal to or more than a threshold angle (the first requirement). Therefore, for example, as compared with a case where whether the steered wheels 111 are in the fully turned state is determined only by the second requirement related to the change rate of the steering angle θ1, erroneous determination in which the steered wheels 111 are in the fully turned state is less likely to occur.

Moreover, the turning angle determination processing is ended when the maximum steering angles are set (step S11). In particular, in the present embodiment, since the maximum steering angle is individually set for each of the steering directions (leftward and rightward) of the steered wheels 111, the turning angle determination processing is ended when both of the maximum steering angles (the left maximum steering angle and the right maximum steering angle) are set. Thus, since the turning angle determination processing is not performed after the maximum steering angles are set, the processing load related to the turning angle determination processing is reduced.

Furthermore, the turning angle determination processing is executed each time the automatic steering mode is started. Therefore, for example, even when the maximum steering angles are set and the turning angle determination processing is ended, if the automatic steering mode is once ended and the automatic steering mode is started again, the turning angle determination processing is also executed again. Thus, even if a person readjusts the stopper mechanism 45 after the automatic traveling is ended, the turning angle determination processing is performed again in the next automatic traveling.

Moreover, in the control method according to the present embodiment, when the steered wheels 111 are determined to be in the fully turned state by the turning angle determination processing, the torque of the motor 421 is limited over the limited period as in steps S5 and S9. That is, as illustrated in FIG. 7, when the steered wheels 111 are determined to be in the fully turned state by the turning angle determination processing at a time point t1, the torque of the motor 421 is limited over a limited period T1 immediately thereafter. FIG. 7 is a graph illustrating a change in the torque of the motor 421 with the horizontal axis as a time axis. In FIG. 7, a two-dot chain line indicates a comparative example in which the speed control is continued even after the steered wheels 111 are determined to be in the fully turned state without providing the limited period T1.

In short, in the comparative example, although the motor 421 is controlled to return the steered wheels 111 to the maximum steering angle after the steered wheels 111 are determined to be in the fully turned state, a gap between the actually measured value and the command value of the rotation number (speed) of the motor 421 is large due to the speed control, and it takes time for the torque of the motor 421 to decrease.

Thus, since a state where large torque is applied to the motor 421 is continued for a relatively long time even after the steered wheels 111 are determined to be in the fully turned state, problems in which the work vehicle 10 is erroneously determined to be in the override state and the load is applied to the motor 421 or the like may be caused.

In contrast, in the present embodiment, the automatic steering processing unit 53 basically performs the speed control of the motor 421 by the speed command value, but switches to the current control in which the current command value is set to "0 A" over the limited period T1 from a time point t2 immediately after the time point t1 to a time point t3. As a result, the torque of the motor 421 sharply decreases from the time point t2 that is the starting point of the limited period T1. Therefore, time required for the torque of the motor 421 to fall below a certain value X1 can be shortened as compared with the comparative example. Consequently, time in which the large torque is applied to the motor 421 after the steered wheels 111 are determined to be in the fully turned state is shortened, and thus, the problems in which the work vehicle 10 is erroneously determined to be in the override state and the load is applied to the motor 421 or the like can be solved.

Incidentally, in the present embodiment, the maximum steering angle in the automatic steering is set to a value obtained by subtracting a margin from the steering angle θ1 of the steered wheels 111 when the steered wheels 111 are determined to be in the fully turned state by the turning angle determination processing. That is, in step S6 of setting the left maximum steering angle, the maximum angle setting processing unit 57 obtains, as the left maximum steering angle, a value obtained by subtracting a predetermined margin from the steering angle θ1 detected by the steering angle sensor 44 at the time point of step S4. As an example, the margin is "0.5°." For example, if the steering angle θ1 of the steered wheels 111 when the steered wheels 111 are determined to be in the left fully turned state is "−51°," "−50.5°" obtained by subtracting the margin from the steering angle θ1 is the left maximum steering angle.

Similarly, in step S10 of setting the right maximum steering angle, the maximum angle setting processing unit 57 obtains, as the right maximum steering angle, a value obtained by subtracting a predetermined margin from the steering angle θ1 detected by the steering angle sensor 44 at the time point of step S8. For example, if the steering angle θ1 of the steered wheels 111 when the steered wheels 111 are determined to be in the right fully turned state is "55°," "54.5°" obtained by subtracting the margin from the steering angle θ1 is the right maximum steering angle.

As described above, the value obtained by subtracting the margin is set as the maximum steering angle, so that the steered wheels 111 can be prevented from being steered to the fully turned state by the automatic steering. Thus, in the automatic steering mode, generation of excessive torque in the motor 421 due to the action of the stopper mechanism 45 can be avoided, erroneous determination of the override state can be avoided by the stopper mechanism 45, and the load applied to the motor 421 or the like can be suppressed to be small.

However, such a margin is not essential, and for example, the steering angle θ1 of the steered wheels 111 when the steered wheels 111 are determined to be in the fully turned state by the turning angle determination processing may be set as the maximum steering angle. In this case, when the steering angle θ1 is controlled to the vicinity of the maximum steering angle (within 5° as an example) by the automatic steering processing, the driving torque of the motor 421 is preferably limited. Thus, in the automatic steering mode, generation of excessive torque in the motor 421 due to the action of the stopper mechanism 45 can be avoided, erroneous determination of the override state can be avoided by the stopper mechanism 45, and the load applied to the motor 421 or the like can be suppressed to be small.

[5.3] Override Determination Processing

Next, processing related to the override determination processing in the control method according to the present embodiment will be described with reference to FIG. 8 to FIG. 15.

As described above, in the automatic steering mode, the override determination processing unit 54 executes the override determination processing of determining whether the work vehicle 10 is in the override state on the basis of the determination condition. A condition related to the torque generated in the motor 421 is set as the determination condition.

In the present embodiment, the determination condition includes a plurality of individual conditions, such as a first individual condition and a second individual condition, related to a magnitude relationship of the torque with respect to different threshold values. The override determination processing unit 54 determines that the work vehicle 10 is in the override state when any one of the plurality of individual conditions is satisfied. That is, the override determination processing unit 54 determines that the work vehicle 10 is in the override state when at least one individual condition is satisfied, and determines that the work vehicle 10 is not in the override state only when all of the plurality of individual conditions are not satisfied.

Figure 8:
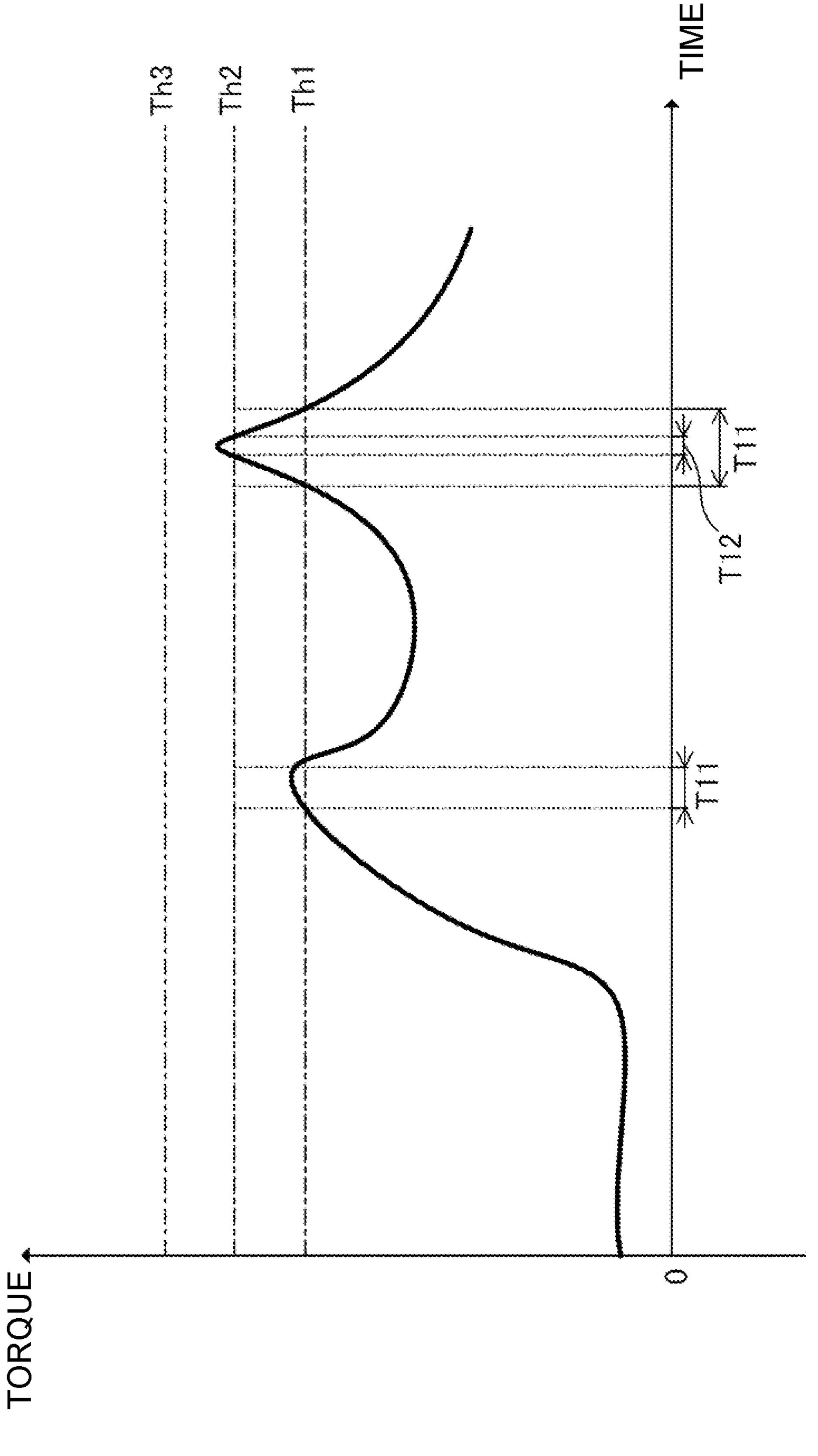
FIG. 8 is a graph illustrating an example of the change in the torque of the motor by the control method of the work vehicle according to the first embodiment.

As illustrated in FIG. 8, it is assumed that the determination condition includes a first individual condition in which the torque of the motor 421 is equal to or more than a first threshold value Th1, a second individual condition in which the torque of the motor 421 is equal to or more than a second threshold value Th2 (>Th1), and a third individual condition in which the torque of the motor 421 is equal to or more than a third threshold value Th3 (>Th2). The first individual condition is continuing a state where the torque is equal to or more than the first threshold value Th1 for a first period of time, and the second individual condition is continuing a state where the torque is equal to or more than the second threshold value Th2 for a second period of time (<the first period of time). The third individual condition is continuing a state where the torque is equal to or more than the third threshold value Th3 for a third period of time (<the second period of time). FIG. 8 is a graph illustrating the change in the torque of the motor 421 with the horizontal axis as a time axis.

In the example of FIG. 8, a period T11 during which the torque of the motor 421 is equal to or more than the first threshold value Th1 is less than the first period of time, whereas a period T12 during which the torque of the motor 421 is equal to or more than the second threshold value Th2 is equal to or more than the second period of time. That is, although the first individual condition and the third individual condition are not satisfied, the second individual condition is satisfied. Thus, the override determination processing unit 54 determines that the determination condition is satisfied, and determines that the work vehicle 10 is in the override state.

As described above, the override determination processing unit 54 determines that the work vehicle 10 is in the override state when any one of the plurality of individual conditions is satisfied, and thus, various override states can be determined.

Consequently, the determination accuracy of the override state is improved.

Furthermore, the determination condition includes a condition related to time. In short, for example, the determination condition includes not only the magnitude of the torque of the motor 421 but also a condition related to time, such as a condition in which a state where the torque of the motor 421 is equal to or more than a threshold value is continued for a certain period of time. Therefore, for example, even when the torque of the motor 421 increases only for a moment in a situation in which external force is applied to the steered wheels 111 only for a moment, such as when the steered wheels 111 climb over a step, erroneous determination of the override state is less likely to occur. Consequently, the determination accuracy of the override state is improved.

Incidentally, in the present embodiment, as described above, the "determination condition" used for the determination of the override state is not fixed, but can be changed by the condition change processing unit 55. In the present embodiment, since the determination condition includes the plurality of individual conditions, the condition change processing unit 55 changes at least one of the plurality of individual conditions.

Specifically, the determination condition is changed in accordance with a command value for controlling the motor 421. The term "command value" mentioned here includes a speed command value, a current command value, a torque command value, and a position command value. However, in the present embodiment, as an example, it is assumed that the determination condition is changed in accordance with the speed command value related to the rotation number (rotation speed) of the motor 421.

Figure 9:
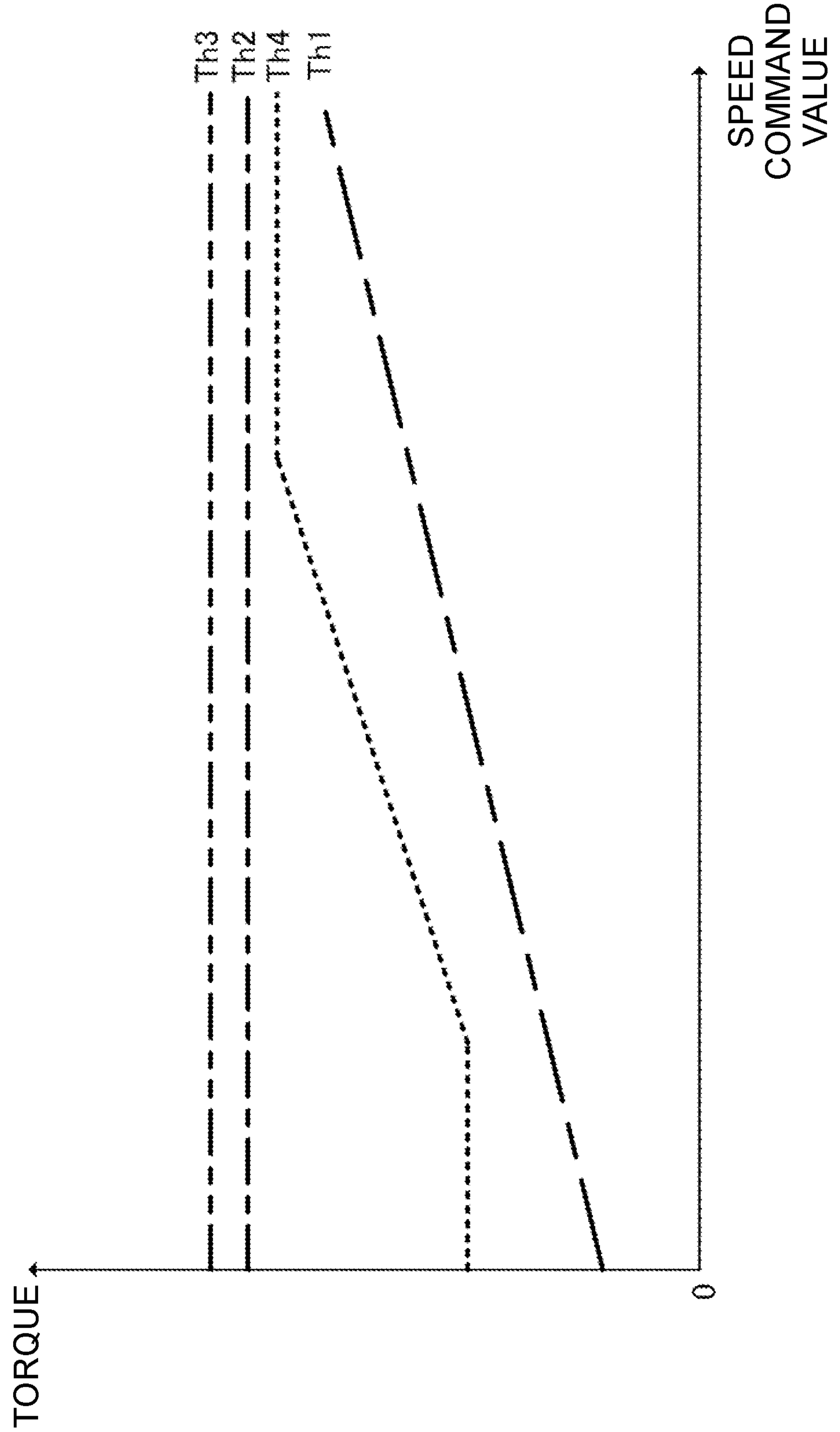
FIG. 9 is a graph illustrating an example of a relationship between a speed command value and threshold values of the torque in the control method of the work vehicle according to the first embodiment.

For example, as illustrated in FIG. 9, a threshold value (here, the first threshold value Th1) in the determination condition is not constant but is changed in accordance with the speed command value. FIG. 9 is a graph illustrating a relationship between the (speed) command value and the threshold values with the horizontal axis representing the speed command value and the vertical axis representing the torque. That is, in the example of FIG. 9, among the first individual condition, the second individual condition, and the third individual condition included in the determination condition, the first threshold value Th1 used in the first individual condition is proportional to the speed command value that defines the rotation number (rotation speed) of the motor 421. That is, as the (speed) command value increases, the threshold value (the first threshold value Th1) for the torque increases, and the determination condition (the first individual condition) becomes stricter. Furthermore, in the example of FIG. 9, a fourth threshold value Th4 that is proportional to the speed command value only in an intermediate region of the speed command value is also set. That is, the determination condition includes, as a fourth individual condition, continuing a state where the torque is equal to or more than the fourth threshold value Th4 for a fourth period of time. The fourth threshold value Th4 is a constant value in upper and lower regions of the intermediate region of the speed command value.

Figure 10:
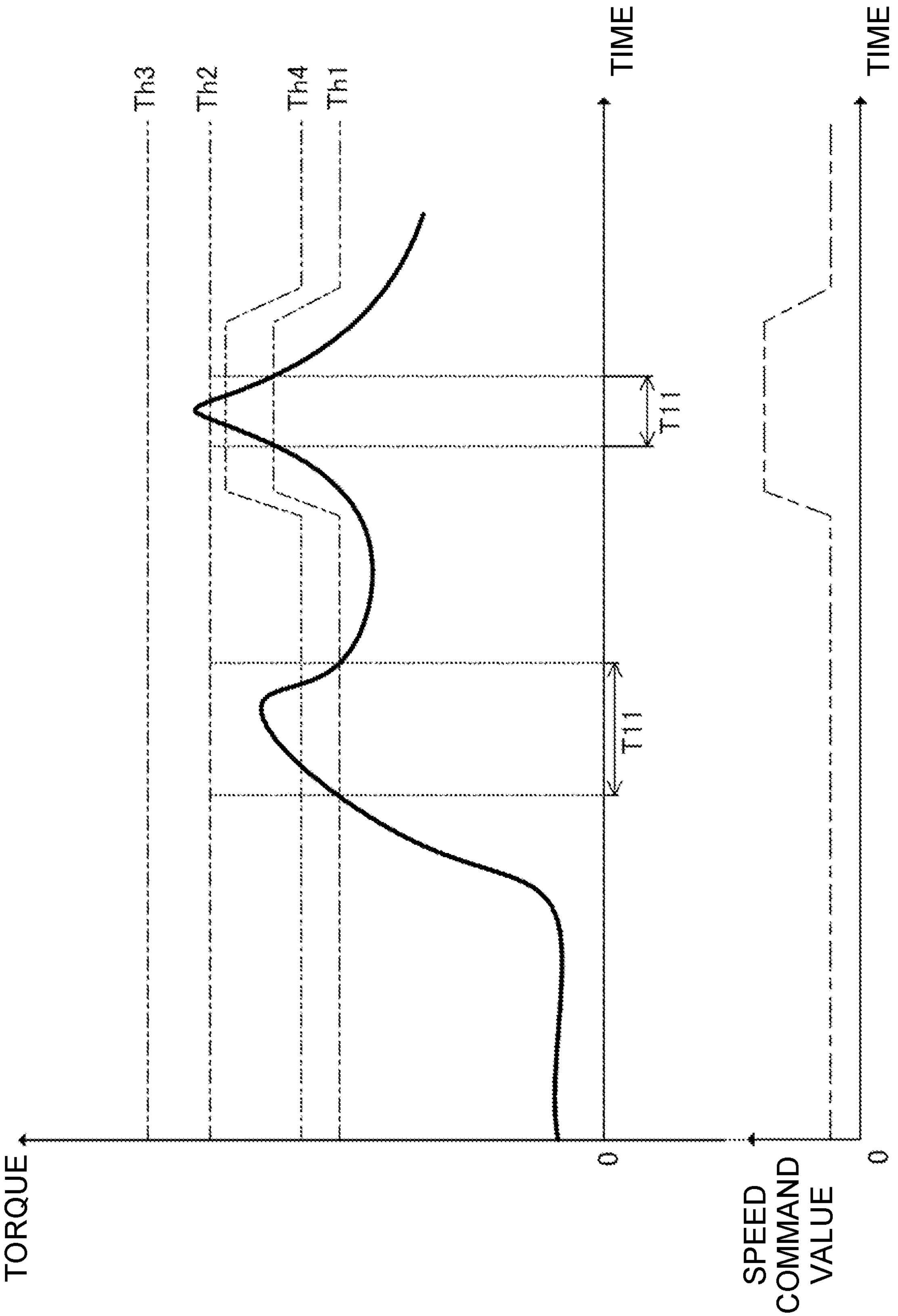
FIG. 10 is a graph illustrating an example of the change in the torque of the motor by the control method of the work vehicle according to the first embodiment.

When the threshold values illustrated in FIG. 9 are used, as illustrated in FIG. 10, if the speed command value is changed, the first threshold value Th1 is also changed. FIG. 10 is a graph illustrating the change in the torque of the motor 421 in the upper part and the change in the speed command value in the lower part with the horizontal axis as a time axis.

In the example of FIG. 10, the period T11 during which the torque of the motor 421 is equal to or more than the first threshold value Th1 is equal to or more than the first period of time. That is, since the first individual condition is satisfied, the override determination processing unit 54 determines that the determination condition is satisfied, and determines that the work vehicle 10 is in the override state.

As described above, the determination condition is changed in accordance with the command value for controlling the motor 421, so that, for example, the determination condition can be made stricter as the speed command value increases. Therefore, as an example, when the work vehicle is turned by 90° along the turning route during the automatic steering, even if excessive torque is generated in the motor 421 due to rapid steering, the determination of the override state is less likely to occur. In contrast, since the determination of the override state is likely to occur in a state where the rapid steering of the steered wheels 111 is less likely to occur, such as during the straight-travel assist, the force necessary for the operation of the steering wheel 41 by the operator for switching to the manual steering becomes relatively small, thereby improving the operability.

Incidentally, in the present embodiment, the determination condition is also changed in accordance with the steering angle θ1 of the steered wheels 111. However, regarding the steering angle θ1, the determination condition is not continuously changed. For example, as illustrated in FIG. 11, an angular range of the steering angle θ1 is divided into a plurality of small regions A1, A2, and A3, and the determination condition to be applied is determined for each of the small regions A1, A2, and A3.

Figure 11:
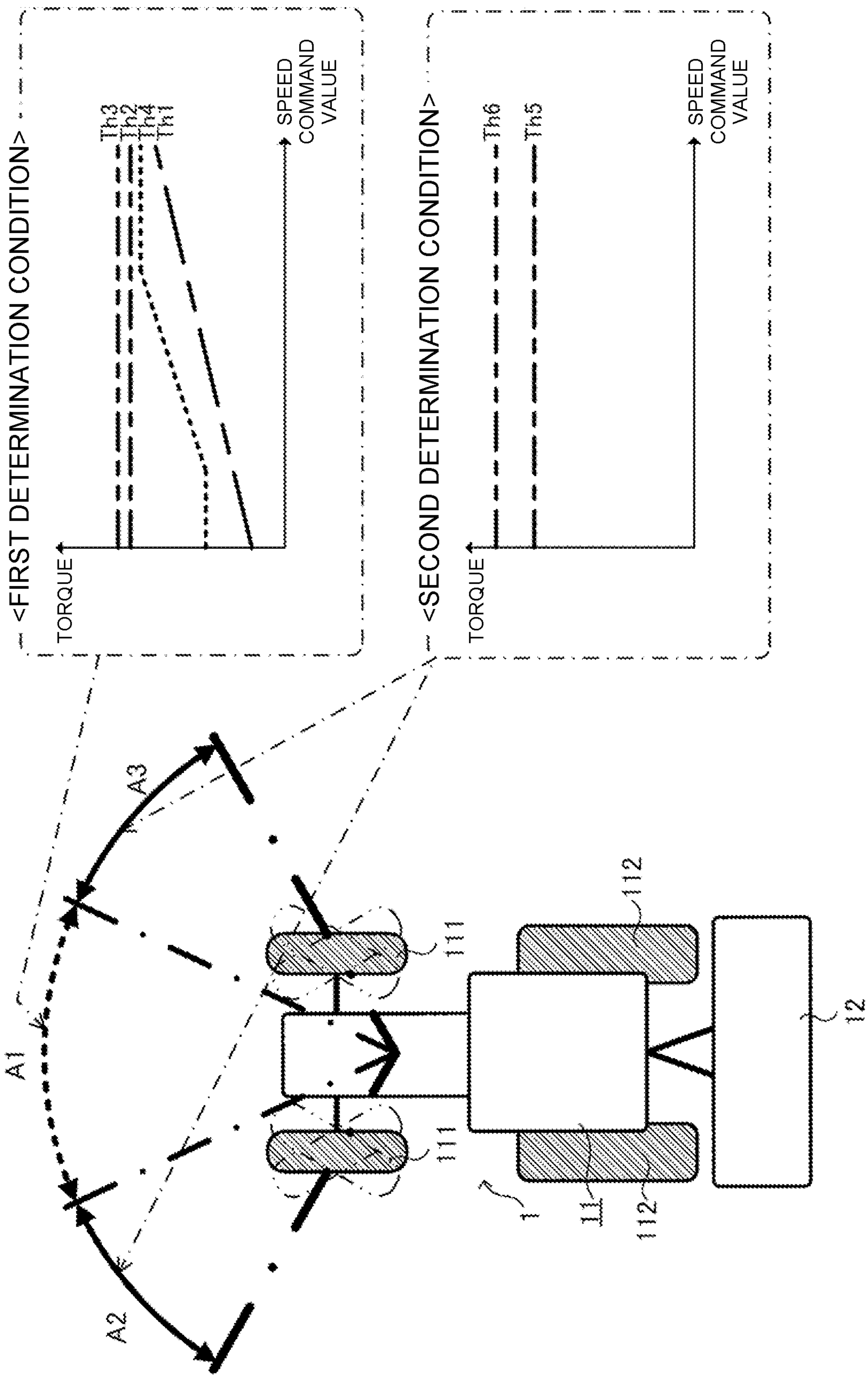
FIG. 11 is a schematic view illustrating an example of assignment of a determination condition in the control method of the work vehicle according to the first embodiment.

In FIG. 11, as an example, regarding the steering angle θ1, a range more than "−25°" and less than "25°" is the small region A1, a range equal to or more than "−60°" and equal to or less than "−25°" is the small region A2, and a range equal to or more than "25°" and equal to or less than "60°" is the small region A3. A "first determination condition" is assigned to the small region A1 as the determination condition, and a "second determination condition" is assigned to the small regions A2 and A3 as the determination condition. That is, when the current steering angle θ1 of the steered wheels 111 is in the small region A1 (−25°<θ1<25°), the override determination processing unit 54 determines whether the work vehicle 10 is in the override state by using the first determination condition. In contrast, when the current steering angle θ1 of the steered wheels 111 is in the small region A2 or the small region A3 (−60°≤θ1<−25°, or 25°≤θ1<60°), the override determination processing unit 54 determines whether the work vehicle 10 is in the override state by using the second determination condition.

The first determination condition is a looser condition, that is, a condition in which the work vehicle 10 is easily determined to be in the override state, than the second determination condition. Specifically, as illustrated in FIG. 11, the first determination condition includes the first to fourth individual conditions using the first to fourth threshold values Th1 to Th4 similar to those in FIG. 10. In contrast, the second determination condition includes a fifth individual condition using a fifth threshold value Th5 and a sixth individual condition using a sixth threshold value Th6. The fifth individual condition is continuing a state where the torque is equal to or more than the fifth threshold value Th5 for a fifth period of time, and the sixth individual condition is continuing a state where the torque is equal to or more than the sixth threshold value Th6 for a sixth period of time (<the fifth period of time). The fifth threshold value Th5 and the sixth threshold value Th6 are constant regardless of the speed command value.

In the first determination condition, the threshold value for the torque is set to be relatively smaller and/or determination time is set to be relatively shorter than those in the second determination condition. That is, the threshold value of the first determination condition (the first to fourth threshold values Th1 to Th4) is set to be smaller than the threshold value of the second determination condition (the fifth and sixth threshold values Th5 and Th6). Alternatively, the determination time of the first determination condition (the first period of time to the fourth period of time) is set to be shorter than the determination time of the second determination condition (the fifth period of time and the sixth period of time).

Therefore, when the steering angle θ1 is in the small region A1, as compared with when the steering angle θ1 is in the small region A2 or the small region A3, the determination condition is looser, and the override determination processing unit 54 can easily determine that the work vehicle 10 is in the override state.

As described above, in the present embodiment, when the angular range of the steering angle θ1 of the steered wheels 111 is divided into the plurality of small regions A1, A2, and A3, the determination condition is changed depending on which of the plurality of small regions A1, A2, and A3 the steering angle θ1 is in. Therefore, an appropriate determination condition can be applied in accordance with the steering angle θ1, and the determination accuracy of the override state can be improved.

In the present embodiment, in particular, since a relatively strict determination condition (the second determination condition) is assigned to the small regions A2 and A3 in which the maximum turning angle is included, erroneous determination of the override state due to the fully turned state is less likely to occur. In contrast, since a relatively loose determination condition (the first determination condition) is assigned to the small region A1, the force necessary for the operation of the steering wheel 41 by the operator for switching to the manual steering becomes relatively small, thereby improving the operability.

Furthermore, the assignment of the determination condition to each of the small regions A1, A2, and A3 as described above is not fixed, and is changed in accordance with a determination result of the turning angle determination processing, for example. In the present embodiment, in particular, since the left fully turned state and the right fully turned state are individually determined, the assignment of the determination condition to each of the small regions A1, A2, and A3 is changed in each of a case where the steered wheels 111 are determined to be in the left fully turned state and a case where the steered wheels 111 are determined to be in the right fully turned state.

Figure 12:
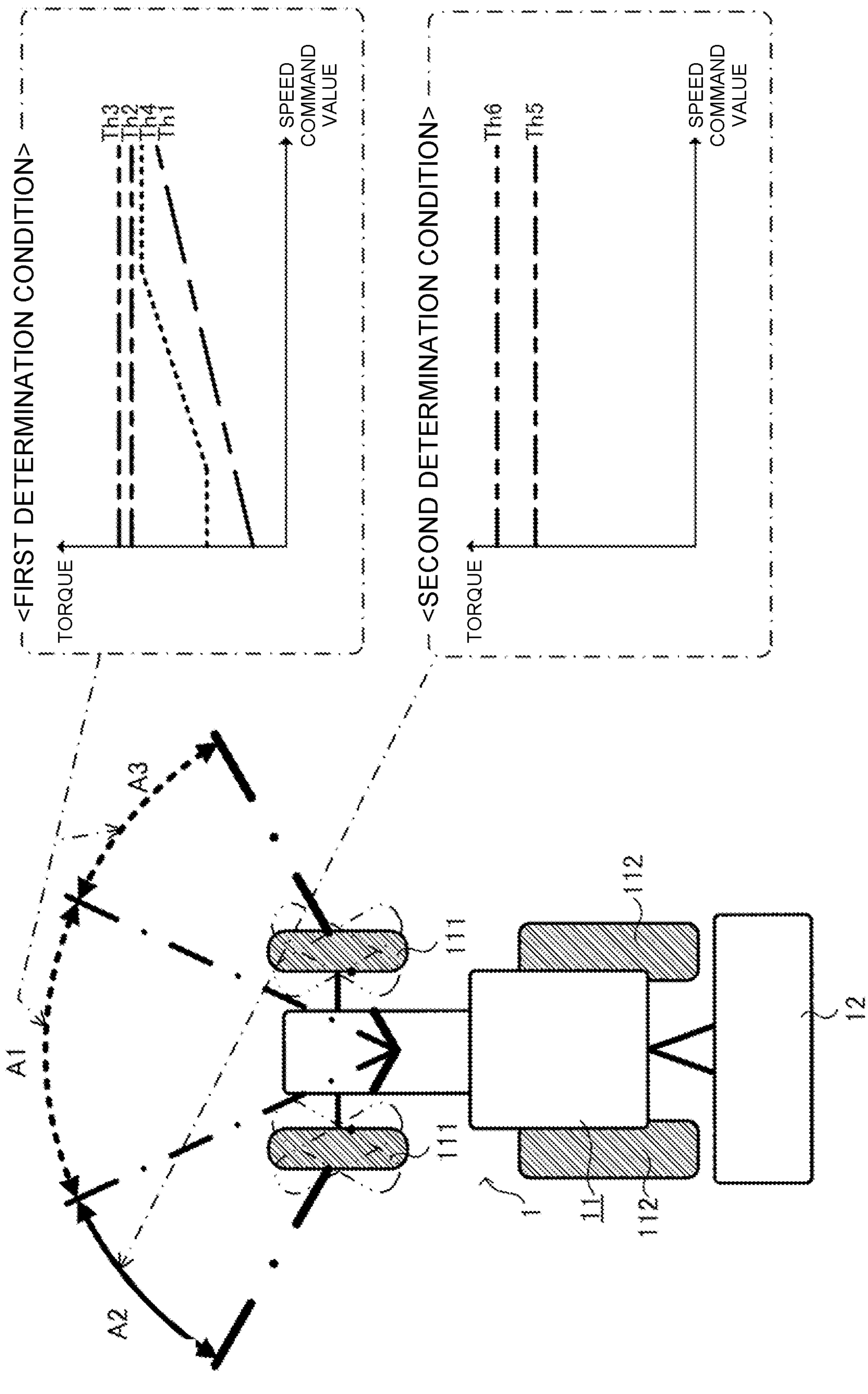
FIG. 12 is a schematic view illustrating an example of the assignment of the determination condition in the control method of the work vehicle according to the first embodiment.

As an example, when the steered wheels 111 are determined to be in the right fully turned state, the assignment of the determination condition to each of the small regions A1, A2, and A3 is changed from the state illustrated in FIG. 11 to the state illustrated in FIG. 12. That is, since the right maximum steering angle is set after the steered wheels 111 are determined to be in the right fully turned state, the steered wheels 111 are not steered to the right fully turned state in the automatic steering mode. As illustrated in FIG. 12, the determination condition assigned to the small region A3 including the rightward maximum turning angle is switched from the "second determination condition" to the "first determination condition" that is the same as the small region A1. Similarly, when the steered wheels 111 are determined to be in the left fully turned state, the determination condition assigned to the small region A2 including the leftward maximum turning angle is switched from the "second determination condition" to the "first determination condition" that is the same as the small region A1.

As described above, in the present embodiment, the determination condition is changed in accordance with the determination result of the turning angle determination processing. Therefore, for example, when the steered wheels 111 are not steered to the fully turned state in the automatic steering mode after the steered wheels 111 are determined to be in the fully turned state, the determination condition of the small region A2 or A3 including the maximum turning angle is loosely changed, so that the determination of the override state is likely to occur. Thus, the force necessary for the operation of the steering wheel 41 by the operator for switching to the manual steering becomes relatively small, thereby improving the operability.

In the control method according to the present embodiment, the turning angle determination processing and the override determination processing are concurrently executed. Thus, basically, the turning angle determination processing and the override determination processing do not interfere with each other, and the fully turned state and the override state are individually determined. However, as described above, only the determination result of the turning angle determination processing is used to change the determination condition of the override determination processing.

Moreover, in the present embodiment, the determination condition is changed after delay time from a time point at which the steered wheels 111 are determined to be steered to the maximum turning angle by the turning angle determination processing. That is, after the steered wheels 111 are determined to be in the fully turned state as described above, processing of changing the assignment of the determination condition to each of the small regions A1, A2, and A3 is executed with a delay of the delay time from the time point of the determination of the fully turned state. As an example, the delay time is "0.1 sec."

According to this configuration, a grace period corresponding to the delay time is provided until the determination condition is changed after the steered wheels 111 are determined to be in the fully turned state. Therefore, for example, the determination condition is eased before the torque completely decreases from the fully turned state in which the excessive torque is generated in the motor 421, and erroneous determination of the override state can be easily avoided.

Figure 13:
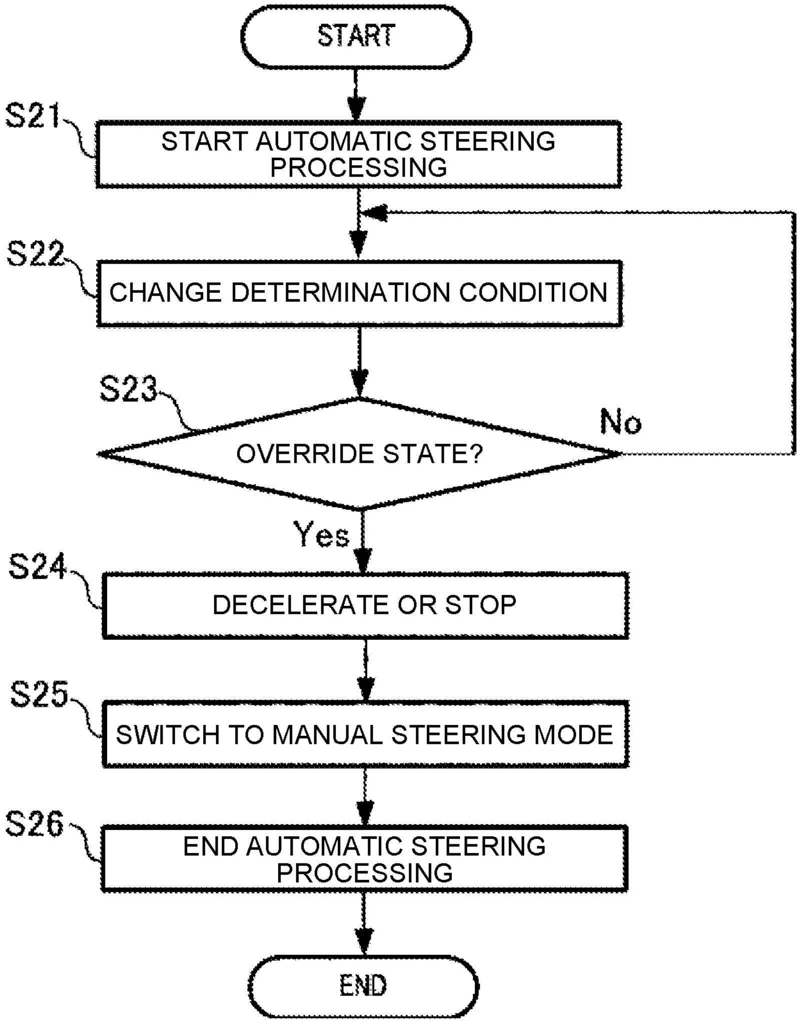
FIG. 13 is a flowchart illustrating an example of processing related to override determination processing in the control method of the work vehicle according to the first embodiment.

FIG. 13 is a flowchart illustrating an example of the processing related to the override determination processing.

The control method according to the present embodiment performs processing illustrated in FIG. 13 each time the automatic steering mode is started.

In other words, the mode switching processing unit 52 switches the action mode from the manual steering mode to the automatic steering mode at the start of the automatic traveling (including the autonomous traveling and the semi-automatic traveling). When the automatic steering mode is started, the automatic steering processing unit 53 starts automatic steering processing (S21). Then, the condition change processing unit 55 changes the determination condition used for the override determination processing (S22). At this time, the condition change processing unit 55 changes the determination condition on the basis of the command value for controlling the motor 421 (the speed command value), the steering angle θ1 of the steered wheels 111, and the determination result of the turning angle determination processing.

In next step S23, the override determination processing unit 54 determines whether the work vehicle 10 is in the override state. At this time, when any one of the plurality of individual conditions included in the determination condition is satisfied, the override determination processing unit 54 determines that the work vehicle 10 is in the override state (S23: Yes), and shifts the processing to step S24. In contrast, when all of the individual conditions are not satisfied, the override determination processing unit 54 determines that the work vehicle 10 is not in the override state (S23: No), and returns the processing to step S22.

In step S24, the traveling control unit 21 decelerates or stops the work vehicle 10. When the work vehicle 10 is only decelerated, the work vehicle 10 continues to travel. In next step S25, the mode switching processing unit 52 switches the action mode from the automatic steering mode to the manual steering mode. Accordingly, the automatic steering processing unit 53 ends the automatic steering processing (S26), and ends a series of processing.

The control system 1 executes the processing of steps S21 to S26 described above each time the automatic steering mode is started. However, the flowchart illustrated in FIG. 13 is merely an example, and the processing may be added or omitted as appropriate, or the order of the processing may be changed as appropriate.

As described above, in the automatic steering mode, the control method according to the present embodiment includes executing the override determination processing of determining whether the work vehicle 10 is in the override state on the basis of the determination condition related to the torque generated in the motor 421. The control method further includes changing the determination condition. Therefore, the determination of the override state can be performed using an appropriate determination condition at each time, and appropriate determination of the override state becomes possible. Thus, as an example, when the work vehicle is turned by 90° along a turning route during the automatic steering, a defect in which excessive torque is generated in a motor of a power steering mechanism due to rapid steering, and the automatic steering is canceled due to the determination of the override state can be easily avoided.

Furthermore, since a threshold value of the torque for the determination of the override state does not need to be set constantly to be large so as to avoid the above-described defect, problems in which the motor 421 is damaged due to a prolonged situation in which the excessive torque is generated in the motor 421 and relatively large force is required for the operation of the steering wheel 41 for switching to the manual steering can be solved.

Moreover, the control method according to the present embodiment further includes, when the work vehicle 10 is determined to be in the override state, switching the action mode of the work vehicle 10 from the automatic steering mode to the manual steering mode in which the operator performs manual steering (S25). Therefore, when the work vehicle 10 is determined to be in the override state, the steering of the steered wheels 111 can be automatically handed over to the operator, and the operability for the operator is improved.

Moreover, the control method according to the present embodiment further includes, when the work vehicle 10 is determined to be in the override state, decelerating a traveling speed of the work vehicle 10 or stopping the work vehicle 10 (S24). Therefore, after the work vehicle 10 is determined to be in the override state, for example, the operator can accelerate or start the work vehicle 10 after confirming a situation around the work vehicle 10.

Figure 14:
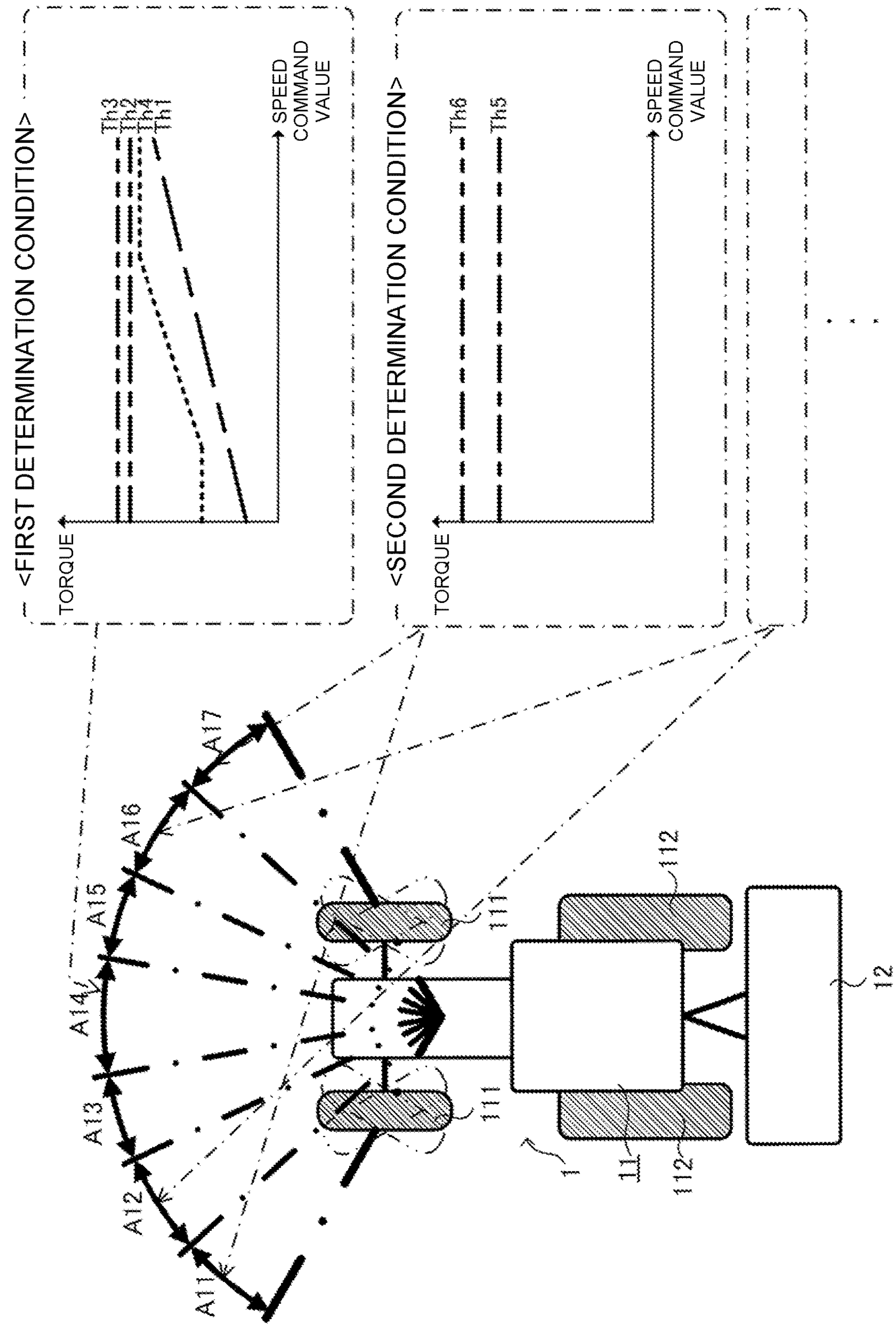
FIG. 14 is a schematic view illustrating an example of the assignment of the determination condition in the control method of the work vehicle according to the first embodiment.

The above-described modification of the determination condition is merely an example, and other various modifications can be applied. For example, as illustrated in FIG. 14, the angular range of the steering angle θ1 may be divided into a larger number of small regions A11 to A17, and the determination condition to be applied may be determined for each of the small regions A11 to A17. Thus, for example, a more appropriate determination condition can be applied in accordance with the characteristics of the work vehicle 10 or the like.

Figure 15:
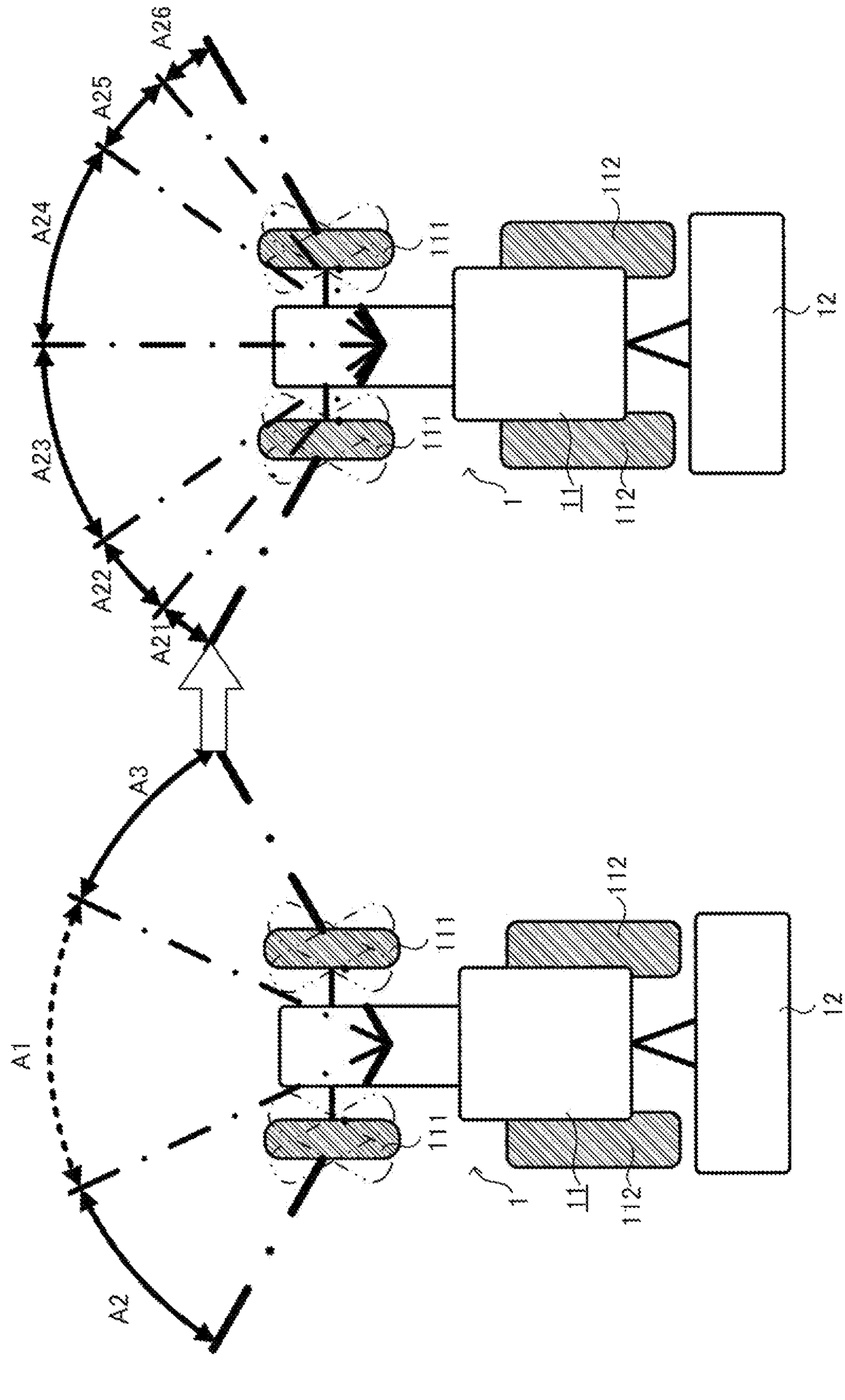
FIG. 15 is a schematic view illustrating an example of the assignment of the determination condition in the control method of the work vehicle according to the first embodiment.

Moreover, when the steered wheels 111 are determined to be in the fully turned state in the turning angle determination processing, as illustrated in FIG. 15, not only the assignment of the determination condition to each of the small regions A1, A2, and A3 but also, for example, the division into small regions may be changed. In the example of FIG. 15, the angular range of the steering angle θ1 is divided into the three small regions A1, A2, and A3 before the steered wheels 111 are determined to be in the fully turned state, whereas the angular range of the steering angle θ1 is divided into six small regions A21 to A26 after the steered wheels 111 are determined to be in the fully turned state. Furthermore, the determination condition assigned to each small region may be changed to a completely different determination condition.

Thus, for example, a more appropriate determination condition can be applied in accordance with the characteristics of the work vehicle 10 or the like.

It is not essential that the determination condition is changed on the basis of the command value (the speed command value), the steering angle θ1, and the determination result of the turning angle determination processing, and the determination condition may be changed on the basis of other parameters.

For example, in the present embodiment, the power steering mechanism 43 is of a hydraulic type, and the amplification factor of the operation force by the power steering mechanism 43 varies in accordance with the engine rotation number of the power source 18. The determination condition may be changed in accordance with the engine rotation number. In this case, the determination condition is preferably eased, for example, the threshold value for the torque becomes smaller as the engine rotation number becomes lower.

The determination condition may be changed on the basis of at least one of the above-described plurality of parameters (the command value, the steering angle θ1, the determination result of the turning angle determination processing, the engine rotation number, and the like).

[6] Modified Examples

Modified examples of the first embodiment will be listed below. The modified examples described below can be applied in appropriate combination.

The control system 1 in the present disclosure includes a computer system. The computer system is mainly configured by one or more processors and one or more memories as hardware. The processors execute a program (the work vehicle control program) recorded in the memories of the computer system, thereby realizing the function as the control system 1 in the present disclosure. The program may be recorded in advance in the memories of the computer system, may be provided through an electric communication line, or may be provided by being recorded in a non-transitory recording medium, such as a memory card, an optical disk, or a hard disk drive, that is readable by the computer system. Moreover, a part or all of the functional units included in the control system 1 may be configured by an electronic circuit.

Moreover, a configuration in which at least a part of the functions of the control system 1 is integrated in one housing is not essential in the control system 1, and the components of the control system 1 may be dispersedly provided in a plurality of devices (for example, the control device 2 and the terminal device 3). In contrast, in the first embodiment, the functions dispersed in a plurality of devices may be integrated in one housing. Furthermore, at least a part of the functions of the control system 1 may be realized by a cloud (cloud computing) or the like.

Moreover, the terminal device 3 is not limited to a general-purpose terminal such as a tablet terminal, a smartphone, or a laptop computer, and may be configured by a dedicated terminal. Furthermore, a plurality of terminal devices 3 may be associated with one work vehicle 10. In this case, the one work vehicle 10 can be controlled by the plurality of terminal devices 3. In contrast, one terminal device 3 may be associated with a plurality of work vehicles 10. In this case, the plurality of work vehicles 10 can be controlled by the one terminal device 3.

Moreover, in the first embodiment, the steered wheels 111 are a pair of right and left front wheels, but are not limited thereto. For example, in addition to or instead of the pair of right and left front wheels, a pair of right and left rear wheels may configure the steered wheels. In this case, the rear wheels as the steered wheels are also steered by the steering device 14. Moreover, the drive wheels 112 are not limited to the pair of right and left rear wheels. For example, in addition to or instead of the pair of right and left rear wheels, the pair of right and left front wheels may configure the drive wheels. Furthermore, the number of the steered wheels 111 may be only one, or may be three or more. Similarly, the number of the drive wheels 112 may be only one, or may be three or more. The same wheels may be used as both the steered wheels 111 and the drive wheels 112.

Moreover, in the first embodiment, the steering angles θ1 of the left front wheel and the right front wheel which are the pair of steered wheels 111 are the same. However, the present embodiment is not limited to this example, and the steering angle of the left front wheel and the steering angle of the right front wheel may be different. In this case, for example, the mean value of the steering angle of the left front wheel and the steering angle of the right front wheel is the steering angle θ1 of the pair of steered wheels 111.

Moreover, the power steering mechanism 43 may be, for example, of an electric type without limiting to a hydraulic type. In the electric power steering mechanism 43, the motor 421 of the steering operation unit 42 may also be used, and the steered wheels 111 may be directly steered by the output of the motor 421. In this case, the determination condition is preferably not changed depending on the engine rotation number.

Moreover, it is not essential that the maximum steering angle is reset each time the automatic steering mode is started, and the maximum steering angle once set may be continuously used in the next automatic steering mode.

Second Embodiment

A control method of the work vehicle 10 according to the present embodiment differs from the first embodiment in parameters for changing the determination condition used for the override determination processing. Hereinafter, the same configurations as those in the first embodiment will be denoted by the same reference numerals, and the explanation thereof will be appropriately omitted.

Figure 16:
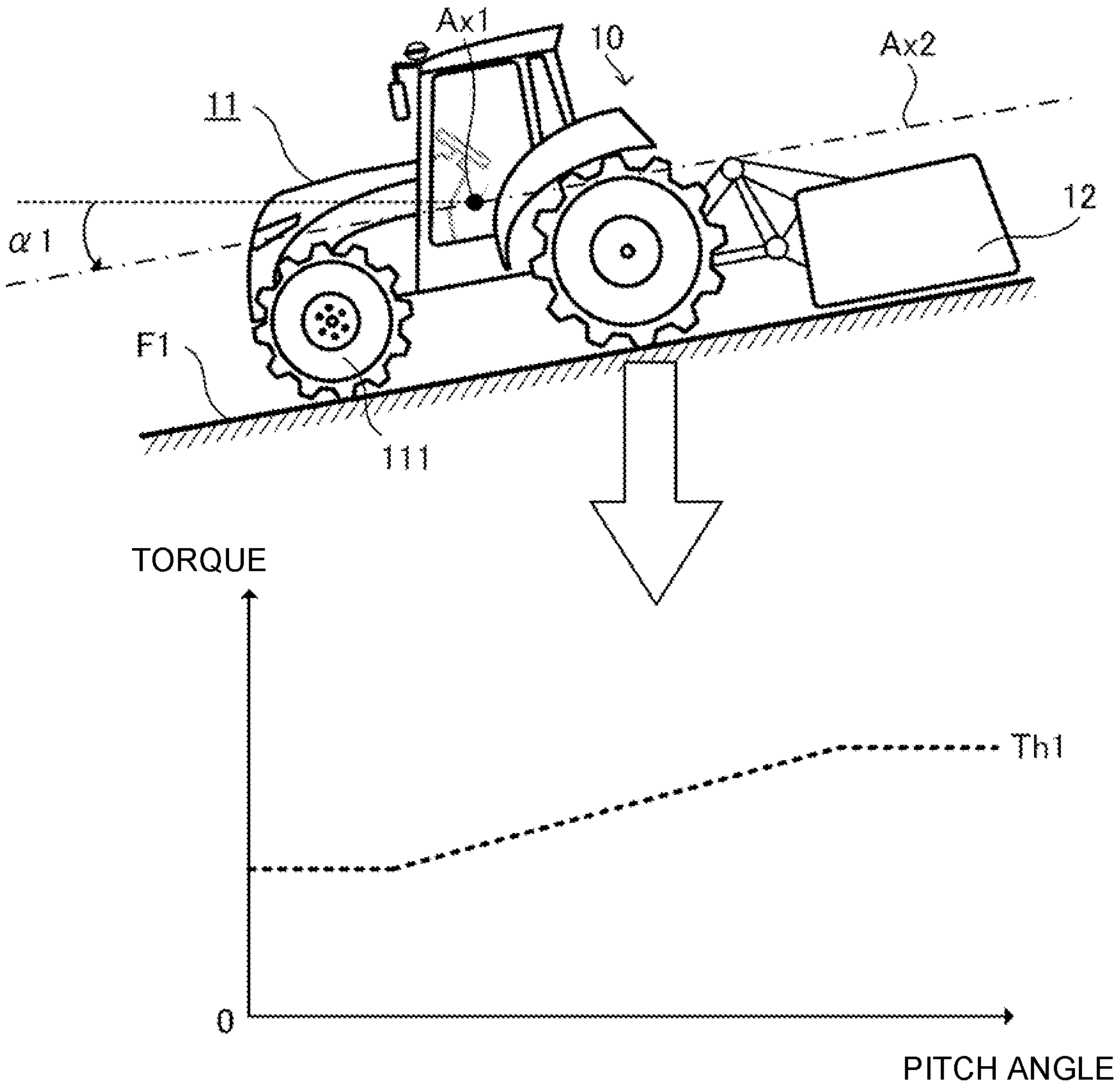
FIG. 16 is a schematic explanatory view illustrating an example of a relationship between a pitch angle and a threshold value of torque in a control method of a work vehicle according to a second embodiment.

In the present embodiment, the determination condition is changed in accordance with at least one of a pitch angle α1 and a roll angle of the work vehicle 10. That is, as illustrated in FIG. 16, the determination condition is changed in accordance with at least one of the pitch angle α1, which is a rotation (inclination) of the machine body 11 about a first axis Ax1 extending in the left-right direction D3 and passing through the center of the machine body 11 of the work vehicle 10, and the roll angle, which is a rotation (inclination) of the machine body 11 about a second axis Ax2 extending in the front-rear direction D2 and passing through the center of the machine body 11.

As an example, it is assumed that the determination condition is changed in accordance with only the pitch angle α1 of the pitch angle α1 and the roll angle. Specifically, as illustrated in FIG. 16, as the pitch angle α1 increases when the machine body 11 leans forward, the threshold value (the first threshold value Th1) for the torque increases, and the determination condition (the first individual condition) becomes stricter. That is, in a case where the front wheels are the steered wheels 111, when the load is biased toward the front portion of the machine body 11, the force necessary for the operation of the steering wheel 41 becomes large, and (the operation feeling of) the steering wheel 41 becomes heavy. Thus, as the pitch angle α1 increases in the forward-leaning posture of the machine body 11, during the automatic steering, the torque generated in the motor 421 of the steering device 14 also increases.

The determination condition is changed in accordance with the pitch angle $\alpha 1$ such that the determination condition becomes stricter as the pitch angle $\alpha 1$ increases. Thus, even when the torque generated in the motor 421 increases due to such bias of the load, erroneous determination of the override state is less likely to occur. Similarly, when the determination condition is changed in accordance with the roll angle, the determination condition is preferably changed such that the determination condition becomes stricter as the roll angle increases.

Moreover, the determination condition may be changed in accordance with a work situation by the work vehicle 10. For example, when the work vehicle 10 travels in a work state in which the work by the work machine 12 is performed, the load applied to the steering of the steered wheels 111 becomes larger compared with when the work vehicle 10 travels in a non-work state in which the work by the work machine 12 is not performed. Thus, for example, during the automatic steering, the determination condition is preferably changed depending on whether the work vehicle 10 is in the work state or in the non-work state such that the determination condition is looser when the work vehicle 10 is in the non-work state than when the work vehicle 10 is in the work state. Thus, even when the torque generated in the motor 421 increases due to the change in the work situation of the work vehicle 10, erroneous determination of the override state is less likely to occur.

As a modified example of the second embodiment, the determination condition may be changed on the basis of any one or more parameters of the pitch angle $\alpha 1$, the roll angle, and the work situation of the work vehicle 10. The configuration of the second embodiment (including the modified example) can be adopted in appropriate combination with various configurations described in the first embodiment (including the modified examples).

[Supplementary Notes of Invention]

Hereinafter, the summary of the invention extracted from the above-described embodiments will be supplemented. Each configuration and each processing function described in the following supplementary notes may be selected, omitted, and combined as appropriate.

<Supplementary Note 1>

A control method of a work vehicle having an automatic steering mode for automatically steering a steered wheel using a motor, comprising:

in the automatic steering mode, controlling the motor; and executing turning angle determination processing of determining whether the steered wheel is in a fully turned state in which the steered wheel is steered to a maximum turning angle on the basis of a turning angle determination condition.

<Supplementary Note 2>

The control method of a work vehicle according to supplementary note 1, wherein the maximum turning angle is defined by a stopper mechanism that limits a movable range of the steered wheel.

<Supplementary Note 3>

The control method of a work vehicle according to supplementary note 1 or 2, wherein the turning angle determination condition includes a torque condition related to torque of the motor.

<Supplementary Note 4>

The control method of a work vehicle according to any one of supplementary notes 1 to 3, wherein the turning angle determination condition includes a change rate condition related to a change rate of a steering angle of the steered wheel.

<Supplementary Note 5>

The control method of a work vehicle according to any one of supplementary notes 1 to 4, wherein the turning angle determination condition includes an absolute value of a steering angle of the steered wheel being equal to or more than a threshold angle.

<Supplementary Note 6>

The control method of a work vehicle according to any one of supplementary notes 1 to 5, further comprising:

setting a maximum steering angle in the automatic steering on the basis of a steering angle of the steered wheel when the steered wheel is determined to be in the fully turned state by the turning angle determination processing.

<Supplementary Note 7>

The control method of a work vehicle according to supplementary note 6, wherein the maximum steering angle in the automatic steering is set to a value obtained by subtracting a margin from the steering angle of the steered wheel when the steered wheel is determined to be in the fully turned state by the turning angle determination processing.

<Supplementary Note 8>

The control method of a work vehicle according to supplementary note 6 or 7, wherein the maximum steering angle is individually set for each of steering directions of the steered wheel.

<Supplementary Note 9>

The control method of a work vehicle according to any one of supplementary notes 6 to 8, wherein the turning angle determination processing is ended when the maximum steering angle is set.

<Supplementary Note 10>

The control method of a work vehicle according to any one of supplementary notes 1 to 9, wherein the turning angle determination processing is executed each time the automatic steering mode is started.

<Supplementary Note 11>

The control method of a work vehicle according to any one of supplementary notes 1 to 10, further comprising:

when the steered wheel is determined to be in the fully turned state by the turning angle determination processing, limiting torque of the motor over a limited period.

<Supplementary Note 12>

A work vehicle control program for causing one or more processors to execute the control method of a work vehicle according to any one of supplementary notes 1 to 11.

REFERENCE SIGNS LIST

1 work vehicle control system
10 work vehicle
11 machine body
45 stopper mechanism
53 automatic steering processing unit
56 turning angle determination processing unit
100 work system
111 steered wheel
421 motor
61 steering angle

The invention claimed is:

1. A control method of a work vehicle having an automatic steering mode for automatically steering a steered wheel using a motor, comprising:

in the automatic steering mode, controlling the motor;

setting a first value as the maximum steering angle of the steered wheel, wherein the first value is obtained by subtracting a margin from the steering angle of the steering wheel when the steered wheel is determined by a steering angle determination process to be in a fully turned state; and executing turning angle determination processing to determine whether the steered wheel is in the fully turned state on the basis of a turning angle determination condition, wherein, in the fully turned state, the steered wheel determined to be at the maximum turning angle.

2. The control method of a work vehicle according to claim 1, wherein the steering angle at the fully turned state is defined by a stopper mechanism that limits a movable range of the steered wheel.

3. The control method of a work vehicle according to claim 1, wherein the turning angle determination condition includes a torque condition related to torque of the motor.

4. The control method of a work vehicle according to claim 1, wherein the turning angle determination condition includes a change rate condition related to a change rate of a steering angle of the steered wheel.

5. The control method of a work vehicle according to claim 1, wherein the turning angle determination condition includes an absolute value of a steering angle of the steered wheel being equal to or more than a threshold angle.

6. The control method of a work vehicle according to claim 1, wherein the maximum steering angle is individually set for each of steering directions of the steered wheel.

7. The control method of a work vehicle according to claim 1, wherein the turning angle determination processing is ended when the maximum steering angle is set.

8. The control method of a work vehicle according to claim 1, wherein the turning angle determination processing is executed each time the automatic steering mode is started.

9. The control method of a work vehicle according to claim 1, further comprising:

when the steered wheel is determined to be in the fully turned state by the turning angle determination processing, limiting torque of the motor over a limited period.

10. A work vehicle control program for causing one or more processors to execute the control method of a work vehicle according to claim 1.

11. A work vehicle control system used in a work vehicle having an automatic steering mode for automatically steering a steered wheel using a motor, comprising:

an automatic steering processing unit that controls the motor in the automatic steering mode;

a maximum angle setting processing unit that sets a first value as the maximum steering angle of the steered wheel, wherein the first value is obtained by subtracting a margin from the steering angle of the steering wheel when the steered wheel is determined by a steering angle determination process to be in a fully turned state; and a turning angle determination processing unit that, in the automatic steering mode, determines whether the steered wheel is in the fully turned state on the basis of a turning angle determination condition, wherein, in the fully turned state, the steered wheel is determined to be at the maximum turning angle.

* * * * *